US011745873B2

(12) United States Patent
Mochida

(10) Patent No.: US 11,745,873 B2
(45) Date of Patent: Sep. 5, 2023

(54) FLYING APPARATUS

(71) Applicant: MINEBEA MITSUMI Inc., Nagano (JP)

(72) Inventor: Yoshihiro Mochida, Abiko (JP)

(73) Assignee: MINEBEA MITSUMI Inc., Nagano (JP)

( * ) Notice: Subject to any disclaimer, the term of this patent is extended or adjusted under 35 U.S.C. 154(b) by 455 days.

(21) Appl. No.: 16/960,200

(22) PCT Filed: Jan. 10, 2019

(86) PCT No.: PCT/JP2019/000488
§ 371 (c)(1),
(2) Date: Jul. 6, 2020

(87) PCT Pub. No.: WO2019/139073
PCT Pub. Date: Jul. 18, 2019

(65) Prior Publication Data
US 2021/0061464 A1    Mar. 4, 2021

(30) Foreign Application Priority Data
Jan. 11, 2018 (JP) ................................ 2018-002535

(51) Int. Cl.
*B64D 17/62* (2006.01)
*B64D 17/80* (2006.01)
(Continued)

(52) U.S. Cl.
CPC ............ *B64C 39/024* (2013.01); *B64D 17/62* (2013.01); *B64D 17/80* (2013.01); *B64D 19/00* (2013.01);
(Continued)

(58) Field of Classification Search
CPC ......... B64D 17/00–17/80; B64D 19/00; B64C 2201/185; B64C 2201/102; B64C 39/024;
(Continued)

(56) References Cited

U.S. PATENT DOCUMENTS 5,169,093 A * 12/1992 Schoffl ................. B64D 17/72
244/152
5,673,873 A    10/1997 Stemme
(Continued)

FOREIGN PATENT DOCUMENTS

CN    102582836 A    7/2012
CN    203876988 U    10/2014
(Continued)

OTHER PUBLICATIONS

International Search Report dated Apr. 9, 2019 for corresponding International Application No. PCT/JP2019/000488.
(Continued)

*Primary Examiner* — Joshua D Huson
*Assistant Examiner* — Anna L. Gordon
(74) *Attorney, Agent, or Firm* — Pearne & Gordon LLP

(57) ABSTRACT

To improve safety during a fall of a flying apparatus, a flying apparatus (1) according to a representative embodiment of the present application includes a body unit (2), a lift-force generating part (3) that is connected to the body unit and generates a lift force, a flight control part (14) that controls the lift-force generating part, an abnormality detecting part (15) that detects an abnormality during flight, a parachute device (4) including a parachute (41, 41A) and a parachute accommodating part (42) that accommodates the parachute, and a fall control part (16) that ejects the parachute from the parachute accommodating part according to the detection of the abnormality by the abnormality detecting part.

12 Claims, 20 Drawing Sheets

(51) Int. Cl.
  *B64D 19/00* (2006.01)
  *B64U 30/12* (2023.01)
  *B64U 70/83* (2023.01)
  *B64C 39/02* (2023.01)
  *B64U 10/13* (2023.01)
  *B64U 30/20* (2023.01)

(52) U.S. Cl.
  CPC .............. *B64U 10/13* (2023.01); *B64U 30/12* (2023.01); *B64U 30/20* (2023.01); *B64U 70/83* (2023.01)

(58) Field of Classification Search
  CPC ........ B64C 2201/108; B64C 2201/027; B64C 3/56; B64C 2201/14; B64C 2201/146; B64C 2201/141; B64C 13/16; B64C 19/00
  See application file for complete search history.

(56) References Cited

U.S. PATENT DOCUMENTS

| | | | |
|---|---|---|---|
| 9,561,858 B2* | 2/2017 | Leidich | B64D 17/76 |
| 9,613,539 B1* | 4/2017 | Lindskog | G08G 5/0069 |
| 10,421,552 B2* | 9/2019 | Tsaliah | B64D 17/76 |
| 2016/0251083 A1 | 9/2016 | Tsaliah et al. | |
| 2016/0264248 A1 | 9/2016 | MacCallum et al. | |
| 2016/0297537 A1 | 10/2016 | MacCallum et al. | |
| 2017/0066537 A1* | 3/2017 | Mitchell | B64C 39/024 |
| 2017/0106986 A1* | 4/2017 | Sweeny | B64D 17/70 |
| 2017/0158338 A1 | 6/2017 | Sweeny et al. | |
| 2017/0233087 A1* | 8/2017 | Homan | B64D 17/26 244/139 |
| 2017/0233088 A1* | 8/2017 | Homan | B64D 17/80 701/3 |
| 2017/0267347 A1 | 9/2017 | Rinaldi et al. | |
| 2017/0267348 A1 | 9/2017 | Sweeny et al. | |
| 2018/0009539 A1 | 1/2018 | Robertson et al. | |
| 2018/0155038 A1* | 6/2018 | Miller | B64D 17/80 |
| 2019/0389590 A1 | 12/2019 | Robertson et al. | |
| 2020/0017224 A1 | 1/2020 | Lunerti et al. | |
| 2020/0108939 A1 | 4/2020 | Tsaliah et al. | |
| 2021/0070456 A1 | 3/2021 | MacCallum et al. | |

FOREIGN PATENT DOCUMENTS

| | | | | |
|---|---|---|---|---|
| CN | 105691606 A | | 6/2016 | |
| CN | 106005363 A | | 10/2016 | |
| CN | 205707374 U | | 11/2016 | |
| CN | 105691606 B | * | 10/2018 | ............ B64C 19/00 |
| EP | 3 611 096 A1 | | 2/2020 | |
| JP | 2017-136879 A | | 8/2017 | |
| JP | 2018-193055 A | | 12/2018 | |
| JP | 2020-508924 A | | 3/2020 | |
| KR | 20160019672 A | | 2/2016 | |
| WO | 2015/059703 A1 | | 4/2015 | |
| WO | 2016/145130 A1 | | 9/2016 | |
| WO | 2018/158686 A1 | | 9/2018 | |
| WO | 2018/190319 A1 | | 10/2018 | |

OTHER PUBLICATIONS

Written Opinion dated Apr. 9, 2019 for corresponding International Application No. PCT/JP2019/000488.
English translation of the Written Opinion dated Apr. 9, 2019 for corresponding International Application No. PCT/JP2019/000488.
International Preliminary Report on Patentability dated Jul. 14, 2020 for corresponding International Application No. PCT/JP2019/000488.
Notice of Reasons for Refusal dated Aug. 3, 2022 for corresponding Japanese Application No. 2019-564731 and English translation.
First Office Action dated Dec. 28, 2022 for corresponding Chinese Application No. 201980008182.8 and English translation.

* cited by examiner

FLYING APPARATUS

TECHNICAL FIELD

The present invention relates to a flying apparatus and relates to, for example, a remotely operable and autonomously flyable and unmanned flying apparatus of a multi-rotor rotary wing aircraft type.

BACKGROUND ART

Practical application of a remotely operable and autonomously flyable and unmanned flying apparatus of a multi-rotor rotary wing aircraft type (hereinafter simply referred to as "rotary wing aircraft" as well) to industrial fields has been examined. For example, in a transportation industry, transportation of cargo by a rotary wing aircraft (a so-called drone) has been examined.

The rotary wing aircraft for transportation has an autonomous flying function of flying while specifying an own position of the rotary wing aircraft with a GPS (Global Positioning System) signal or the like. However, when an abnormality occurs in the rotary wing aircraft because of some cause, it is likely that the rotary wing aircraft cannot autonomously fly and an accident such as a fall of the rotary wing aircraft occurs. Accordingly, improvement of safety of the rotary wing aircraft is desired.

As related art for improving safety of a rotary wing aircraft, for example, Patent Literature 1 discloses a technique for, when the rotary wing aircraft detects an abnormality in a flying direction, stopping autonomous flying and switching the autonomous flying to manual flying by operation of a user.

DOCUMENT LIST

Patent Literature

Patent Literature 1: Japanese Patent Application Publication No. 2017-136879

SUMMARY OF INVENTION

Technical Problem

Incidentally, in the future, it is expected that an increase in the size of a body of the rotary wing aircraft for transportation will be advanced such that larger cargo can be transported. For example, a maximum loading capacity of the rotary wing aircraft for transportation currently being examined is approximately 30 kg. However, from a request for, for example, an increase in a loading weight, it is necessary to increase the weight of the body of the rotary wing aircraft to 150 kg or more.

When such a large rotary wing aircraft becomes uncontrollable because of some cause and falls, compared with a rotary wing aircraft in the past, it is highly likely that the large rotary wing aircraft may cause serious damage to people and structures. Accordingly, the present inventor considered it necessary to regard safety as more important than ever when the size of the rotary wing aircraft is increased.

The present invention has been devised in view of the above, and an object of the present invention is to improve safety during a fall of a flying apparatus.

Solution to Problem

A flying apparatus according to a representative embodiment of the present invention is characterized by including: a body unit; a lift-force generating part that is connected to the body unit and generates a lift force; a flight control part that controls the lift-force generating unit; an abnormality detecting part that detects an abnormality during flight; a parachute device including a parachute, a small flying object coupled to the parachute, and a parachute accommodating part that accommodates the parachute and the small flying object; and a fall control part that ejects the small flying object from the parachute accommodating part according to the detection of the abnormality by the abnormality detecting part.

Effects of Invention

According to an aspect of the present invention, it is possible to improve safety during a fall of the flying apparatus.

DESCRIPTION OF EMBODIMENTS

1. Overview of an Embodiment

Figure 1:
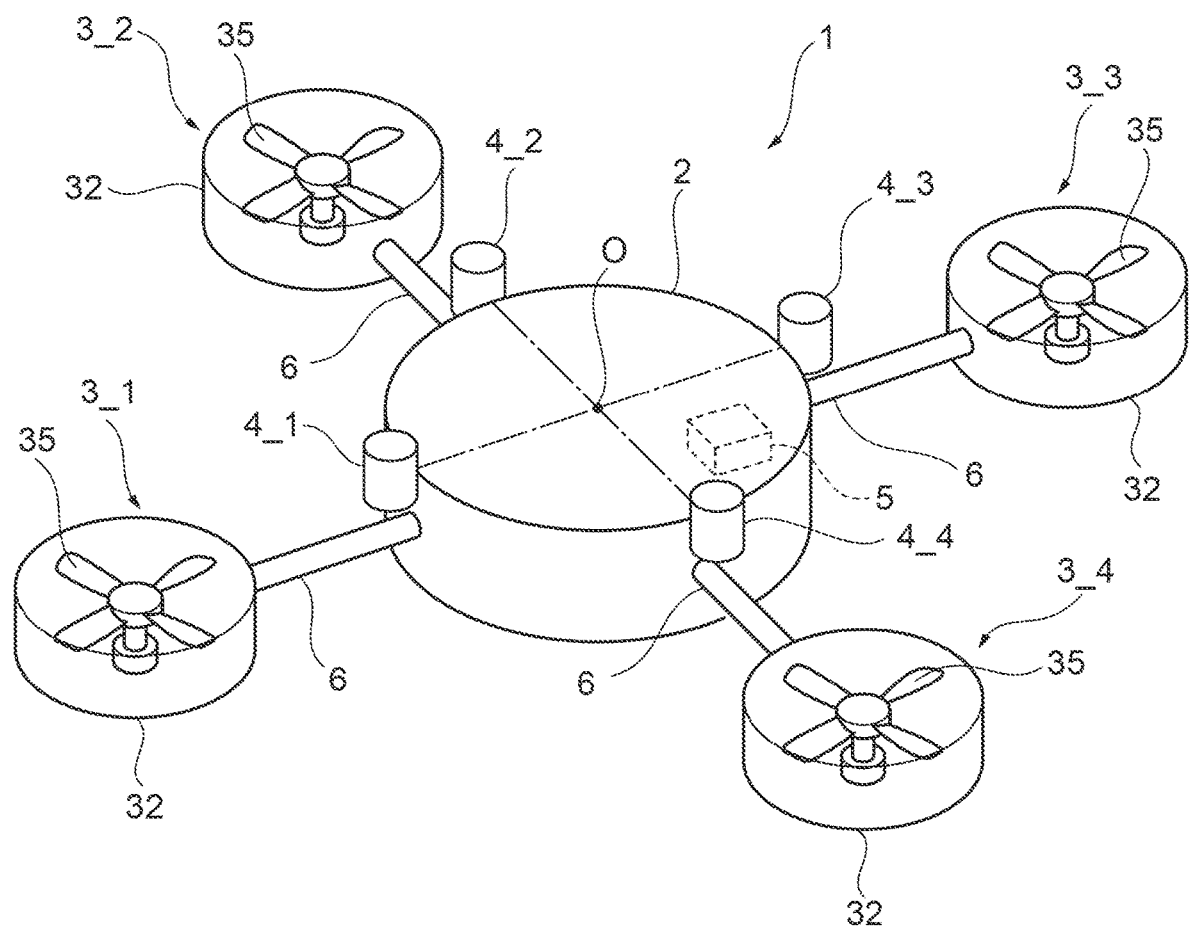
FIG. 1 A diagram schematically showing an exterior of a flying apparatus according to a first embodiment of the present invention.

First, an overview is explained about a representative embodiment of the present invention disclosed in the present application. Note that, in the following explanation, as an example, reference numerals and signs on the drawings corresponding to the constituent elements of the invention are described with parentheses attached to the reference numerals.

[1] A flying apparatus (1, 1A) according to the representative embodiment of the present invention is characterized by including a body unit (2, 2A), a lift-force generating part (3_1 to 3_n) that is connected to the body unit and generates a lift force, a flight control part (14) that controls the lift-force generating part, an abnormality detecting part (15) that detects an abnormality during flight, a parachute device (4, 4_1 to 4_m, 4A, 4B) including a parachute (41, 41A) and a parachute accommodating part (42) that accommodates the parachute, and a fall control part (16, 16A) that ejects the parachute from the parachute accommodating part according to the detection of the abnormality by the abnormality detecting part.

[2] In the flying apparatus, the parachute device may further include a small flying object (40) coupled to the parachute, and the fall control part may eject the small flying object from the parachute accommodating part and eject the parachute.

[3] In the flying apparatus, the flying apparatus may include a plurality of the parachute accommodating parts, and the fall control part may eject a plurality of the small flying objects of the respective plurality of parachute devices while staggering the ejections in time.

[4] In the flying apparatus, the fall control part may preferentially eject the small flying object of the parachute device disposed in a farthest position of the body unit from a ground.

[5] In the flying apparatus, the flying apparatus may further include a sensor part (12) that detects a tilt of the body unit, and the fall control part may select, based on a detection result of the sensor part, the parachute device disposed in a farthest position of the body unit from a ground among the parachute devices from which the small flying objects are not ejected and eject the small flying object of the selected parachute device first.

[6] In the flying apparatus, the fall control part may eject, following the small flying object ejected first, the small flying object of the parachute device disposed opposite to the parachute device, which ejected the small flying object first, across a center part of the body unit.

[7] In the flying apparatus, the fall control part may eject the small flying objects in one direction in order from the parachute device adjacent to the parachute device that ejected the small flying object first.

[8] In the flying apparatus, the fall control part may eject the small flying objects in one direction in order from the parachute device adjacent to the parachute device that ejected the small flying object second.

[9] In the flying apparatus (1A), the flying apparatus may further include an openable and closable resistance wing (7), and the fall control part may open the resistance wing according to the detection of the abnormality by the abnormality detecting part.

[10] In the flying apparatus, the resistance wing may be foldable according to control from the fall control part.

[11] In the flying apparatus, the small flying object may include a gas generating device (401) that generates gas, a housing (400) that accommodates the gas generating device and includes, on an inside, a gas emission chamber (402) in which a plurality of gas emission holes (404) for emitting the gas generated from the gas generating device are formed, and a plurality of nozzles (405) respectively coupled to the gas emission holes of the housing and provided to be inclined with respect to an axis of the housing.

[12] In the flying apparatus, the parachute (41A) may include a parachute body (410), a suspension cord (411) that couples the parachute body and the body unit, and a bar-like elastic member (412) that extends between a top part of the parachute body and an edge part of the parachute body in the parachute body.

[13] In the flying apparatus, the parachute device (4B) may further include a wire (43) that couples the small flying object and the parachute body and a parachute opening control device (44) that controls unfolding of the parachute body, and the parachute opening control device may apply a compression load to the elastic member to deform the elastic member in a state in which a tensile force of the wire is lower than a predetermined level and, when the tensile force of the wire exceeds the predetermined level, release the compression load of the elastic member.

[14] In the flying apparatus, the flying apparatus may further include an informing device (5), and the fall control part may control the informing device according to the detection of the abnormality by the abnormality detecting part and inform an outside that the flying apparatus is in a dangerous state.

2. Specific Examples of Embodiments

Hereinafter, specific examples of embodiments of the present invention are explained with reference to the drawings. Note that, in the following explanation, components common to the embodiments are denoted by the same reference numerals and signs and repeated explanation of the components is omitted. It should be noted that the drawings are schematic drawings and relations among dimensions of the components, ratios of the components, and the like are sometimes different from actual relations, ratios, and the like. Portions having relations among dimensions and ratios different from one another are sometimes included among the drawings.

First Embodiment

FIG. 1 is a diagram schematically showing an exterior of a flying apparatus according to a first embodiment of the present invention.

A flying apparatus 1 shown in FIG. 1 is, for example, a multi-rotor rotary wing aircraft type flying apparatus mounted with three or more rotors and is a so-called drone.

As shown in FIG. 1, the flying apparatus 1 includes a body unit 2, lift-force generating parts 3_1 to 3_$n$ ($n$ is an integer equal to or larger than 3), parachute devices 4_1 to 4_$m$ ($m$ is an integer equal to or larger than 3), an informing device 5, and arm parts 6.

The body unit 2 is a main body part of the flying apparatus 1 and, as explained below, accommodates various functional parts for controlling flight of the flying apparatus 1. Note that, in FIG. 1, as an example, the body unit 2 having a columnar shape is illustrated. However, the shape of the body unit 2 is not particularly limited.

The lift-force generating parts 3_1 to 3_$n$ are rotors that generate a lift force. Note that, in the following explanation, when the lift-force generating parts 3_1 to 3_$n$ are not particularly distinguished, the lift-force generating parts 3_1 to 3_$n$ are simply described as "lift-force generating parts 3".

The number of the lift-force generating parts 3 included in the flying apparatus 1 is not particularly limited but is preferably three or more. For example, as shown in FIG. 2A to FIG. 2D, the flying apparatus 1 may be any of a tricopter including three lift-force generating parts 3, a quadcopter including four lift-force generating parts 3, a hexacopter including six lift-force generating parts, and an octocopter including eight lift-force generating parts 3.

Note that, in FIG. 1, as an example, a case in which the flying apparatus 1 is a quadcopter mounted with four ($n$=4) lift-force generating parts 3_1 to 3_4 is illustrated.

Figure 3:
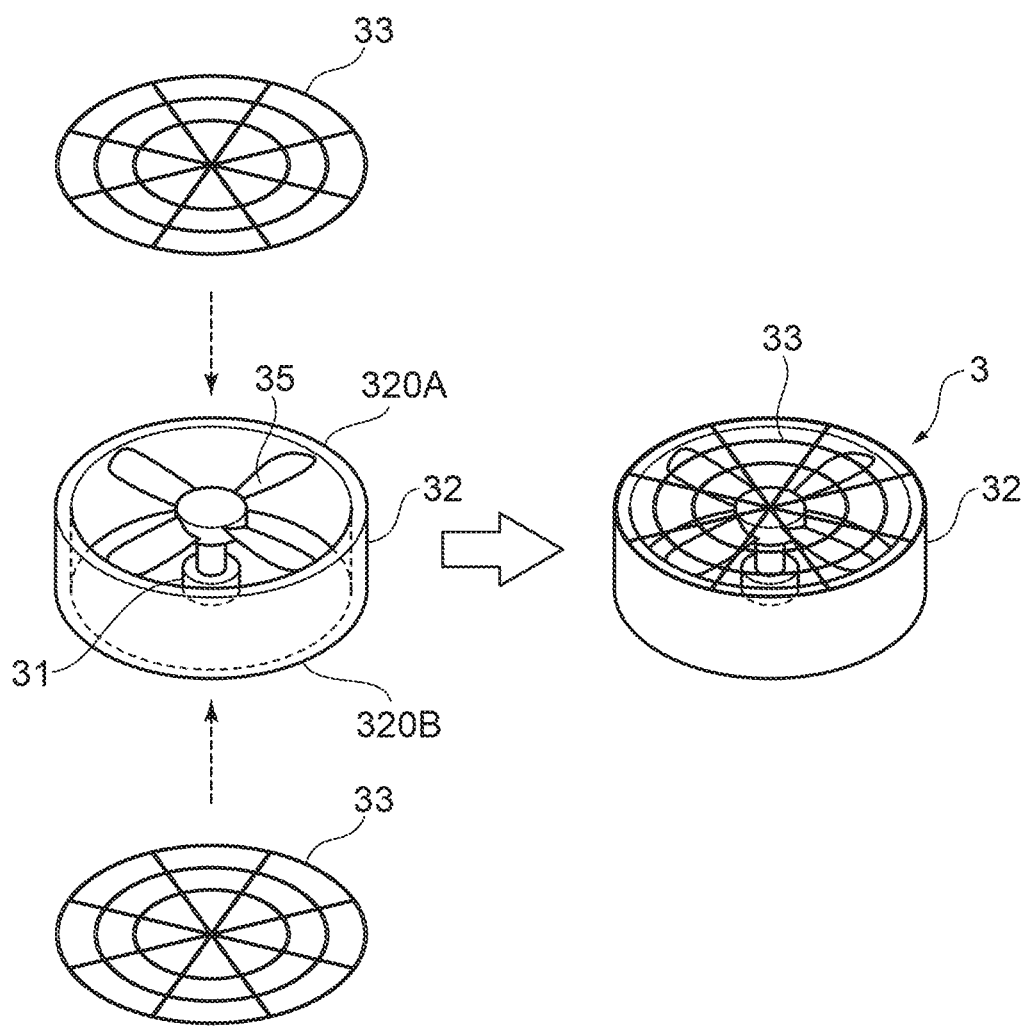
FIG. 3 A diagram schematically showing a configuration of a lift-force generating part according to the first embodiment.

FIG. 3 is a diagram schematically showing a configuration of the lift-force generating part 3.

The lift-force generating part 3 has, for example, a structure in which a propeller 35 and a motor 31 that rotates the propeller 35 are accommodated in a tubular casing 32. As shown in FIG. 3, protection nets 33 for preventing contact with the propeller 35 are provided in opening parts 320A and 320B of the tubular casing 32. The protection nets 33 are formed from, for example, a metal material (stainless steel or the like).

The arm parts 6 are structures for coupling the body unit 2 and the lift-force generating parts 3. The arm parts 6 are formed to project from the body unit 2. The lift-force generating parts 3 are respectively attached to the distal ends of the arm parts 6.

The parachute devices 4_1 to 4_$m$ are devices for reducing falling speed during a fall of the flying apparatus 1. In the following explanation, when the parachute devices 4_1 to 4_$m$ are not particularly distinguished, the parachute devices 4_1 to 4_$m$ are simply described as "parachute devices 4".

The number of the parachute devices 4 included in the flying apparatus 1 is not particularly limited but, when safety of a body during a fall is considered, is preferably three or more. For example, as shown in FIG. 3, the parachute devices 4 as many as the lift-force generating parts 3 may be provided in the flying apparatus 1.

Note that, in FIG. 1, as an example, a case in which the flying apparatus 1 is mounted with four parachute devices 4_1 to 4_4 ($m$=4) is illustrated.

The parachute devices 4_1 to 4_$m$ are set in the body unit 2 in a form surrounding a center part O of the body unit 2. When m is an even number, it is preferable that each parachute accommodating part 42 is disposed opposite to another one parachute accommodating part 42 across the center part O.

Figure 2A:
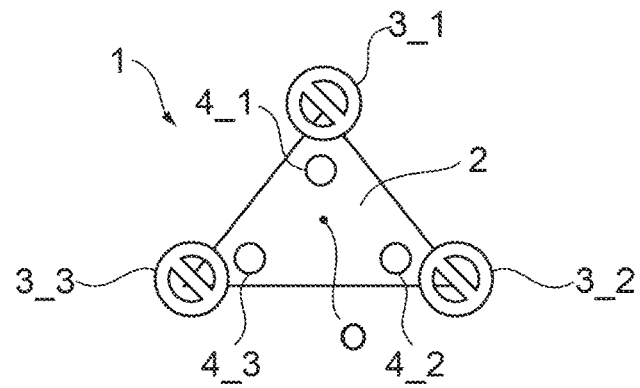
FIG. 2A A diagram showing an example of the number of lift-force generating parts included in the flying apparatus according to the first embodiment.
Figure 2B:
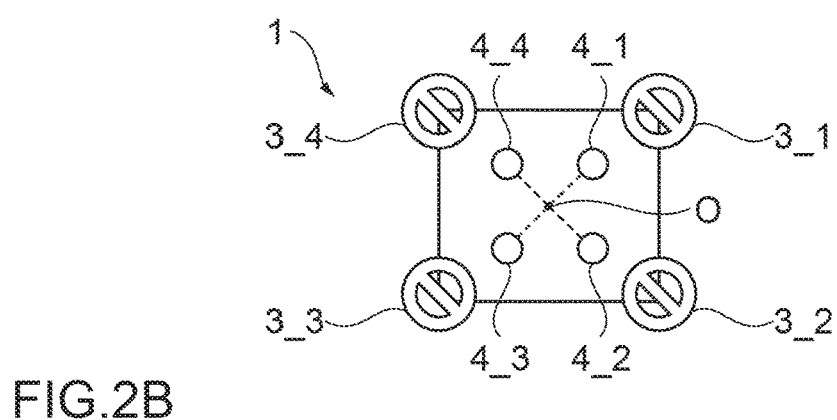
FIG. 2B A diagram showing an example of the number of lift-force generating part included in the flying apparatus according to the first embodiment.
Figure 2C:
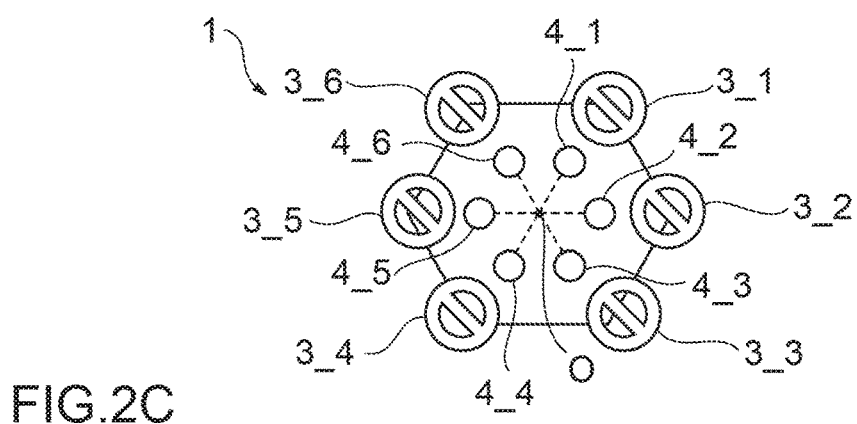
FIG. 2C A diagram showing an example of the number of lift-force generating part included in the flying apparatus according to the first embodiment.
Figure 2D:
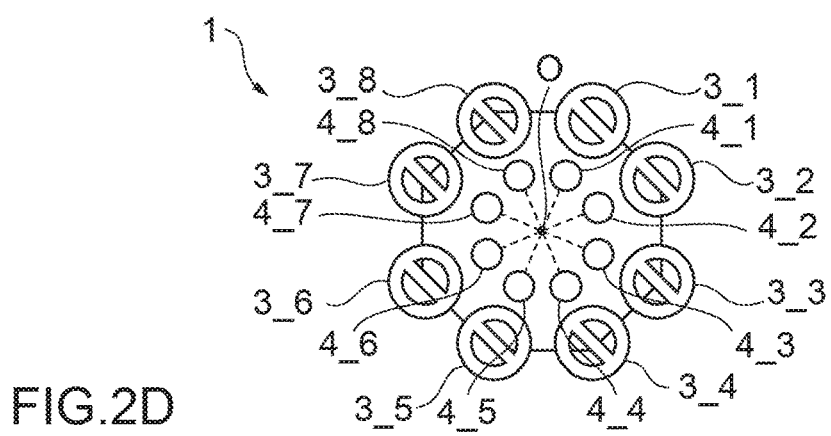
FIG. 2D A diagram showing an example of the number of lift-force generating part included in the flying apparatus according to the first embodiment.

For example, when the flying apparatus 1 includes the four parachute devices 4_1 to 4_4, as shown in FIG. 1 and FIG. 2B, the parachute device 4_1 and the parachute device 4_3 are disposed opposite to each other across the center part O and the parachute device 4_2 and the parachute device 4_4 are disposed opposite to each other across the center part O. As shown in FIG. 2C and FIG. 2D, the same applies when m=6, 8.

Figure 4:
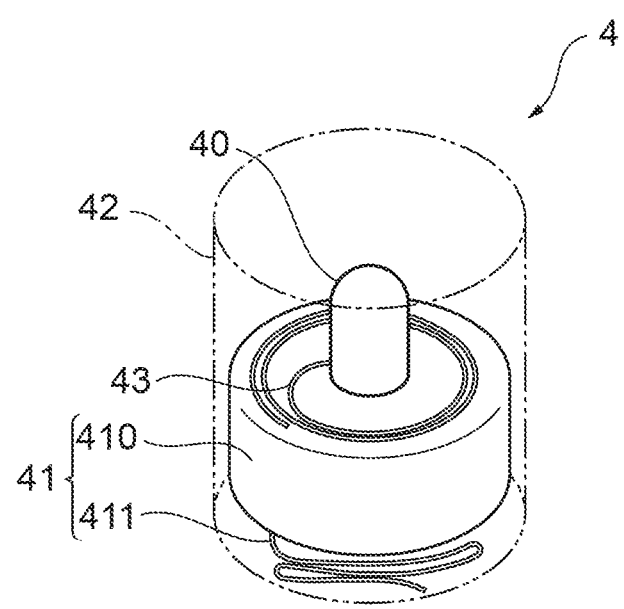
FIG. 4 A diagram schematically showing a configuration of a parachute device according to the first embodiment.

FIG. 4 is a diagram schematically showing a configuration of the parachute device 4.

The parachute device 4 includes the parachute accommodating part 42, a parachute 41, and a small flying object 40.

The parachute accommodating part 42 is formed from, for example, a tubular metal material (for example, stainless steel). As shown in FIG. 4, the parachute 41 and the small flying object 40 are accommodated on the inside of the tubular parachute accommodating part 42.

The parachute accommodating part 42 is provided in the body unit 2. For example, each parachute accommodating part 42 is provided in the body unit 2 such that axes of the respective parachute accommodating parts 42 are parallel to the vertical direction. A position on the body unit 2 where the parachute accommodating part 42 is provided may be an upper surface (a surface on the opposite side of the ground surface during flight of the flying apparatus 1) of the body unit 2 or may be a side surface of the body unit 2. Note that, in FIG. 1, as an example, a case in which the parachute accommodating part 42 is provided on the side surface of the body unit 2 is illustrated.

The parachute 41 includes a parachute body (a canopy) 410 and a suspension cord 411 that couples the parachute body 410 and the body unit 2 (the parachute accommodating part 42). The parachute body 410 is coupled to the small flying object 40 by a wire 43. For example, as shown in FIG. 4, the parachute body 410 is accommodated in the parachute accommodating part 42 in a folded state.

A diameter D of the parachute body 410 necessary for causing the flying apparatus 1 to fall at low speed can be calculated by, for example, the following Formula (1). In Formula (1), m is a total weight of the flying apparatus 1, v is falling speed of the flying apparatus 1, p is air density, and Cd is a resistance coefficient.

[Formula 1]

$$D = \frac{2}{v}\sqrt{\frac{2mg}{\rho\pi \cdot Cd}} \quad (1)$$

For example, when the total weight m of the flying apparatus 1=250 [kg], the resistance coefficient Cd=0.9, and the air density ρ=1.3 kg/m, the diameter D of the parachute body 410 necessary for setting the falling speed v of the flying apparatus 1 to 5 [m/s] is calculated as 19.5 [m] from Expression (1).

The small flying object 40 is a device for ejecting the parachute 41 to the outside of the parachute accommodating part 42 and obtains thrust by jetting gas.

Figure 5A:
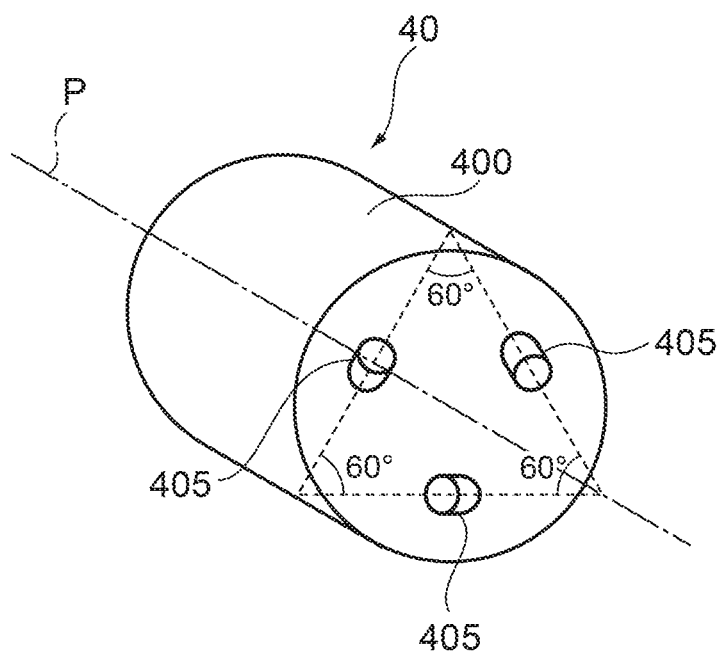
FIG. 5A A diagram schematically showing a configuration of a small flying object according to the first embodiment.
Figure 5B:
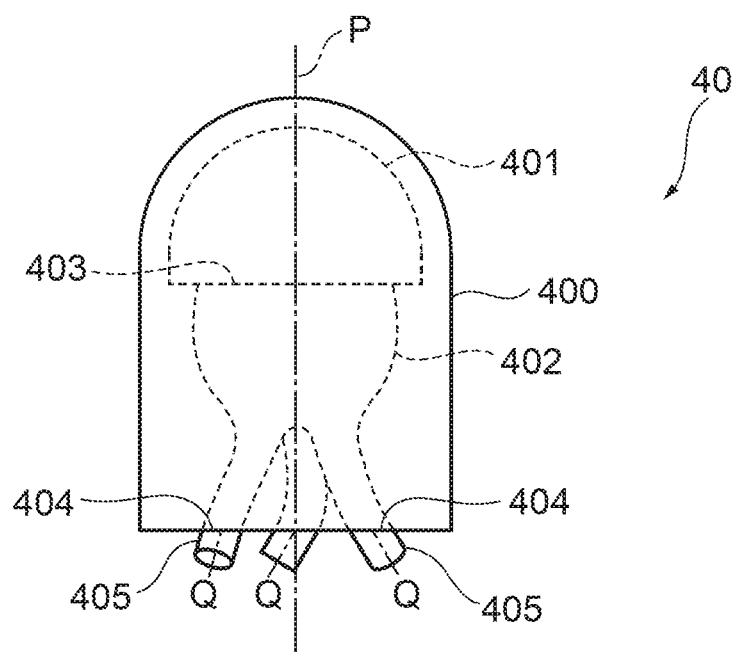
FIG. 5B A diagram schematically showing the configuration of the small flying object according to the first embodiment.

FIG. 5A and FIG. 5B are diagrams schematically showing the configuration of the small flying object 40. In FIG. 5A, a perspective view showing an exterior of the small flying object 40 is shown. In FIG. 5B, a sectional shape of the small flying object 40 is shown.

As shown in FIG. 5A and FIG. 5B, the small flying object 40 includes a housing 400, a gas generating device 401, and nozzles 405.

The gas generating device 401 is a device that generates gas serving as a base of thrust for ejecting the small flying object 40 to the outside of the parachute accommodating part 42. The gas generating device 401 is a device that generates gas and includes, for example, an igniter, a gas generating agent, and an ignition control part (not shown in the figures).

The ignition control part ignites the igniter according to an ignition signal from a fall control part 16 explained below and causes the gas generating agent to chemically react to thereby generate gas.

The housing 400 is a casing that accommodates the gas generating device 401. For example, the housing 400 has a dome shape in overall view. The housing 400 is formed by, for example, fiber-reinforced plastics (FRP) or a metal material.

As shown in FIG. 5B, a gas emission chamber 402 for adjusting pressure of the gas generated from the gas generating device 401 and emitting the gas is formed on the inside of the housing 400.

In the gas emission chamber 402, a gas introduction hole 403 for introducing the gas generated from the gas generating device 401 and a plurality of gas emission holes 404 for emitting the introduced gas are formed. In the present embodiment, as an example, it is assumed and explained that three gas emission holes 404 are formed in the gas emission chamber 402 of the small flying object 40. However, the number of the gas emission holes 404 formed in the gas emission chamber 402 is not particularly limited.

The nozzles 405 are components for jetting the gas in the gas emission chamber 402 to the outside. The nozzles 405 have, for example, a cylindrical shape and are provided to respectively communicate with the gas emission holes 404 corresponding to the nozzles 405.

It is preferable that the nozzles 405 are provided to be inclined with respect to an axis P of the housing 400. That is, it is preferable that the nozzles 405 are provided to communicate with the gas emission holes 404 of the housing 400 such that axes Q of injection ports of the nozzles 405 and the axis P of the housing 400 are nonparallel.

For example, the three nozzles 405 are disposed such that the directions of the injection ports of the nozzles 405 deviate by 60 degrees from one another.

The nozzles 405 only have to be cylindrical and are not limited to the shape shown in FIG. 5A and FIG. 5B. For example, the nozzles 405 may have a shape obtained by bending a cylinder and may be disposed such that the directions of the injection ports of the nozzles 405 deviate by 60 degrees from one another.

In the small flying object 40, when the ignition control part ignites the gas generating agent according to an ignition signal from the fall control part 16 explained below, gas generated from the gas generating agent fills the gas emission chamber 402 via the gas introduction hole 403. The gas in the gas emission chamber 402 is compressed and emitted to the outside from the nozzles 405 through the gas emission holes 404. Consequently, the small flying object 40 obtains thrust and is ejected to the outside from the parachute accommodating part 42.

At this time, when the nozzles 405 are provided to be inclined with respect to the axis P of the housing 400 as explained above, since the gas is jetted obliquely to the axis P of the housing 400, the small flying object 40 flies while rotating. Consequently, it is possible to linearly eject the small flying object 40 in the axial direction of the parachute accommodating part 42.

Figure 6:
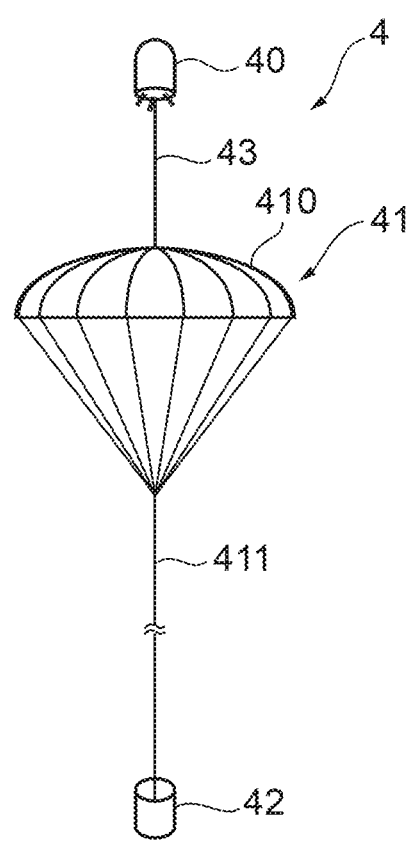
FIG. 6 A diagram schematically showing the parachute device according to the first embodiment in a state in which a parachute is opened.

FIG. 6 is a diagram schematically showing the parachute device 4 in a state in which the parachute 41 is opened.

As shown in FIG. 6, when the small flying object 40 is ejected from the parachute accommodating part 42 according to control from the fall control part 16 explained below, the parachute 41 is pulled by the small flying object 40 via the wire 43 and ejected from the parachute accommodating part 42. Thereafter, in the parachute 41 further pulled by the small flying object 40, air enters the inside of the parachute body 410 in the folded state, whereby the parachute body 410 expands. Consequently, the parachute 41 is opened.

The informing device 5 is a device for informing a dangerous state to the outside of the flying apparatus 1. The informing device 5 is configured to include, for example, a light source formed by an LED or the like and a sound generating device (an amplifier, a speaker, and the like). The informing device 5 informs, according to detection of an abnormality by the abnormality detecting part 15, with light or sound, the outside that the flying apparatus 1 is in a dangerous state.

Note that the informing device 5 may be exposed to the outside of the body unit 2 or may be accommodated on the inside of the body unit 2 in a form the informing device 5 can output light from the light source or sound from the speaker to the outside.

Thereafter, functional parts accommodated in the body unit 2 are explained.

Figure 7:
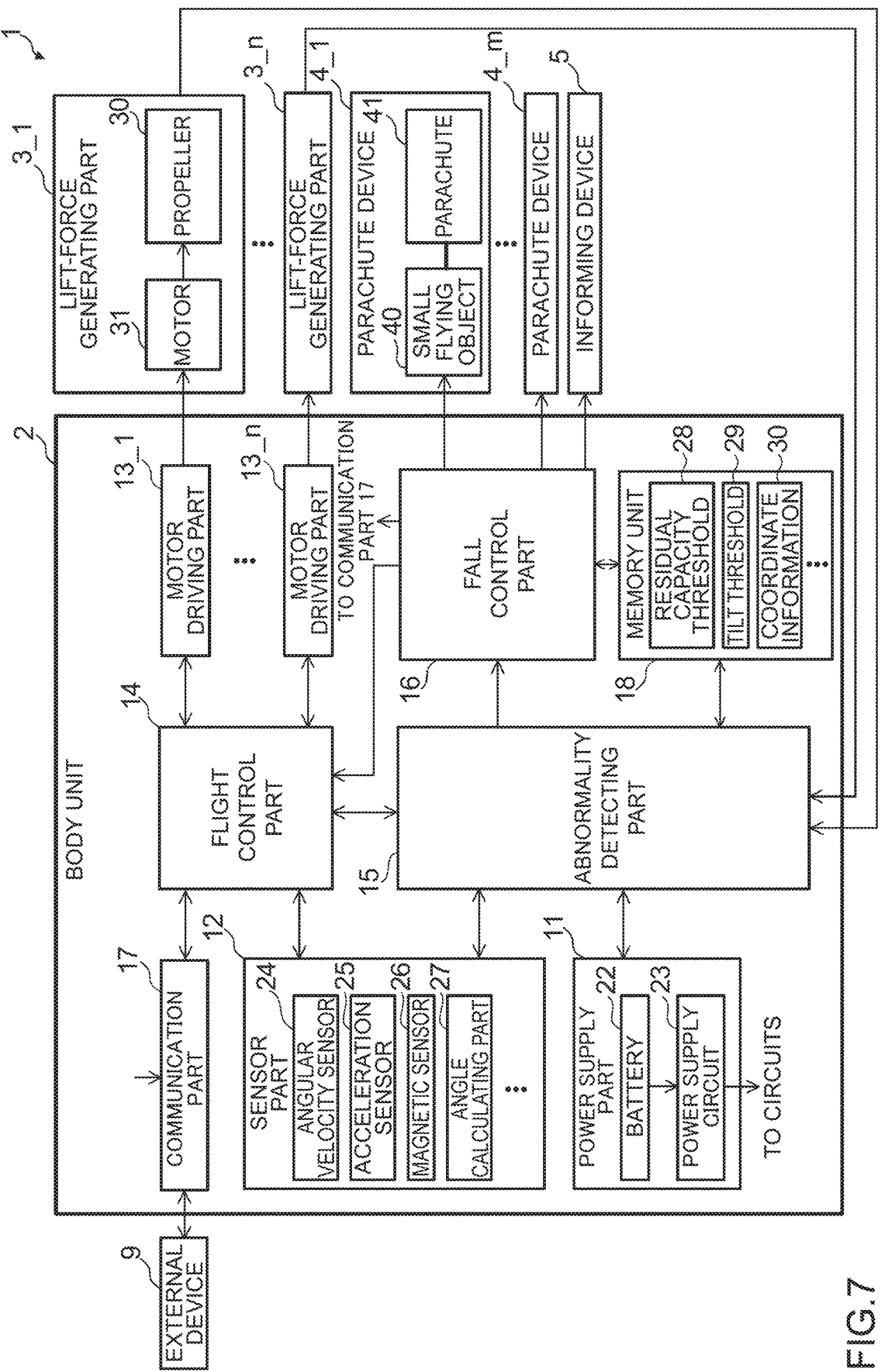
FIG. 7 A functional block diagram of the flying apparatus according to the first embodiment.

FIG. 7 is a functional block diagram of the flying apparatus 1 according to the first embodiment.

As shown in the figure, the body unit 2 includes a power supply part 11, a sensor part 12, motor driving parts 13_1 to 13_n (n is an integer equal to or larger than 2), a flight control part 14, an abnormality detecting part 15, a fall control part 16, a communication part 17, and a memory unit 18.

Among these functional parts, the flight control part 14, the abnormality detecting part 15, and the fall control part 16 are realized by cooperation of program processing by a program processing device such as a microcontroller, which includes a CPU (Central Processing Unit) and a memory, and hardware.

The power supply part 11 includes a battery 22 and a power supply circuit 23. The battery 22 is, for example, a secondary battery (for example, a lithium ion secondary battery). The power supply circuit 23 is a circuit that generates a power supply voltage based on an output voltage of the battery 22 and supplies the power supply voltage to respective kinds of hardware that realize the functional parts. The power supply circuit 23 includes, for example, a plurality of regulator circuits and generates a power supply voltage necessary for each of the kinds of hardware.

The sensor part 12 is a functional part that detects a state of the flying apparatus 1. The sensor part 12 detects a tilt of a body of the flying apparatus 1. Specifically, the sensor part 12 includes an angular velocity sensor 24, an acceleration sensor 25, a magnetic sensor 26, and an angle calculating part 27.

The angular velocity sensor 24 is a sensor that detects angular velocity (rotational speed) and is, for example, a three-axis gyro sensor that detects angular velocity based on three reference axes, that is, an x axis, a y axis, and a z axis.

The acceleration sensor 25 is a sensor that detects acceleration and is, for example, a three-axis acceleration sensor that detects angular velocity based on the three reference axes, that is, the x axis, the y axis, and the z axis.

The magnetic sensor 26 is a sensor that detects terrestrial magnetism and is, for example, a three-axis terrestrial magnetism sensor (an electronic compass) that detects an azimuth (an absolute direction) based on the three reference axes, that is, the x axis, the y axis, and the z axis.

The angle calculating part 27 calculates, based on a detection result of at least one of the angular velocity sensor 24 and the acceleration sensor 25, as a tilt of the body of the flying apparatus 1, an angle of the body with respect to the ground (the horizontal direction).

For example, the angle calculating part 27 may calculate, based on a detection result of the angular velocity sensor 24, the angle of the body with respect to the ground or may calculate, based on detection results of the angular velocity sensor 24 and the acceleration sensor 25, the angle of the body with respect to the ground. Note that, as a method of calculating an angle using the detection results of the angular velocity sensor 24 and the acceleration sensor 25, a publicly-known calculation formula only has to be used.

The angle calculating part 27 may correct, based on a detection result of the magnetic sensor 26, the angle calculated based on the detection result of at least one of the angular velocity sensor 24 and the acceleration sensor 25.

Note that the sensor part 12 may include, for example, an air pressure sensor, an ultrasonic sensor, a GPS receiver, and a camera in addition to the angular velocity sensor 24, the acceleration sensor 25, and the magnetic sensor 26 explained above.

The communication part 17 is a functional part for performing communication with an external device 9 such as a transmitter or a server. The communication between the communication part 17 and the external device 9 is realized by, for example, wireless communication in an ISM band (a 2.4 GHz band). The communication part 17 is configured by, for example, an antenna and an RF (Radio Frequency) circuit.

The communication part 17 receives operation information for the flying apparatus 1 from the external device 9 and outputs the operation information to the flight control part 14 and transmits various measurement data and the like measured by the sensor part 12 to the external device 9. When an abnormality is detected by the abnormality detecting part 15, the communication part 17 transmits, to the external device 9, information indicating that the abnormality has occurred in the flying apparatus 1. Further, when the flying apparatus 1 has fallen to the ground according to fall control processing explained below, the communication part 17 transmits, to the external device 9, information indicating that the flying apparatus 1 has fallen.

The motor driving parts 13_1 to 13_$n$ are functional parts that are provided for the respective lift-force generating parts 3 and drive the motors 31 according to an instruction from the flight control part 14.

Note that, in the following explanation, when the motor driving parts 13_1 to 13_$n$ are not particularly distinguished, the motor driving parts 13_1 to 13_$n$ are simply described as "motor driving parts 13".

The motor driving parts 13 drive the motors 31 such that the motors 31 rotates at the number of revolutions instructed from the flight control part 14. The motor driving parts 13 are, for example, ESCs (Electronic Speed Controllers).

The flight control part 14 is a functional part that controls the lift-force generating parts 3 such that the flying apparatus 1 stably flies. Specifically, the flight control part 14 calculates, based on the operation information (rise and fall, advance and retract, and the like) from the external device 9 received via the communication part 17 and a detection result of the sensor part 12, appropriate rotational speed of the motors 31 of the lift-force generating parts 3 and instructs the calculated rotational speed to the motor driving parts 13 such that the flying apparatus 1 flies in a desired direction in a state in which the body is stable.

For example, the flight control part 14 calculates appropriate rotational speed of the motors 31 of the lift-force generating parts 3 based on a detection result of the angular velocity sensor 24 and instructs the calculated rotational speed to the motor driving parts 13 such that the body becomes horizontal when the posture of the body is suddenly disturbed because of the influence from the outside such as wind.

For example, the flight control part 14 calculates appropriate rotational speed of the motors 31 of the lift-force generating parts 3 based on a detection result of the acceleration sensor 25 and instructs the calculated rotational speed to the motor driving parts 13 such that drift of the flying apparatus 1 is prevented during hovering of the flying apparatus 1.

The flight control part 14 performs transmission and reception of data between the flight control part 14 and the external device 9 via the communication part 17.

The memory unit 18 is a functional part for storing various programs, parameters, and the like for controlling the operation of the flying apparatus 1 and is configured from a nonvolatile memory such as a flash memory or a ROM, a RAM, and the like.

As the parameters stored in the memory unit 18, coordinate information 30 representing positions on the body unit 2 of the parachute devices 4 (the parachute accommodating parts 42) and a residual capacity threshold 28 and a tilt threshold 29 explained below can be illustrated.

The abnormality detecting part 15 is a functional part that detects an abnormality during flight. Specifically, the abnormality detecting part 15 monitors the detection result of the sensor part 12, a state of the battery 22, and an operation state of the lift-force generating part 3 and determines whether the flying apparatus 1 is in an abnormal state.

The abnormal state means a state in which it is likely that autonomous flight of the flying apparatus 1 becomes impossible. For example, the abnormal state means a state in which at least one of a failure of the lift-force generating part 3, a residual capacity of the battery 22 smaller than a predetermined threshold, and an abnormal tilt of the body (the body unit 2) occurs.

The abnormality detecting part 15 determines that the flying apparatus 1 is in the abnormal state when it detects a failure of the lift-force generating part 3, for example, when detecting that the motor 31 does not rotate at the number of revolutions instructed by the flight control part 14, the propeller 35 does not rotate, and the propeller 35 is broken.

The abnormality detecting part 15 determines that the flying apparatus 1 is in the abnormal state when detecting that the residual capacity of the battery 22 is smaller than a predetermined threshold (hereinafter referred to as "residual capacity threshold" as well) 28.

The residual capacity threshold 28 only has to be, for example, a capacity value of a degree in which the motor cannot rotate at the number of revolutions instructed by the flight control part 14. For example, the residual capacity threshold 28 is stored in the memory unit 18 in advance.

The abnormality detecting part 15 determines that the flying apparatus 1 is abnormal when detecting an abnormal tilt of the body of the flying apparatus 1. For example, the abnormality detecting part 15 determines that the flying apparatus 1 is in the abnormal state when a state in which the angle calculated by the angle calculating part 27 exceeds a predetermined threshold (hereinafter referred to as "tilt threshold" as well) 29 continues for a predetermined period.

For example, an angle (a pitch angle) at the time when the flying apparatus 1 moves in the front-back direction and an angle (a roll angle) at the time when the flying apparatus 1 moves in the left-right direction only have to be acquired by an experiment in advance. The tilt threshold 29 only has to be set to a value larger than those angles. The tilt threshold 29 is stored in, for example, the memory unit 18 in advance.

The fall control part 16 is a functional part for controlling a fall of the flying apparatus 1. Specifically, when the abnormality detecting part 15 determines that the flying apparatus 1 is in the abnormal state, the fall control part 16 executes fall preparation processing for causing the flying apparatus 1 to safely fall.

As the fall preparation processing, the fall control part 16 controls the informing device 5 according to the detection of the abnormality by the abnormality detecting part 15 and informs the outside that the flying apparatus 1 is in a dangerous state.

As the fall preparation processing, the fall control part 16 controls the motor driving part 13 to stop the rotation of the motor 31 according to the detection of the abnormality by the abnormality detecting part 15.

Further, as the fall preparation processing, according to the detection of the abnormality by the abnormality detecting part 15, the fall control part 16 outputs an ignition signal for instructing ignition to the ignition control part of the small flying object 40, which should be ejected, to thereby eject the small flying object 40 from the parachute accommodating part 42 to open the parachute 41.

At this time, the fall control part 16 performs parachute opening control for ejecting the small flying objects 40 of the respective plurality of parachute devices 4_1 to 4_m while staggering the ejections in time. Specifically, as the parachute opening control, the fall control part 16 preferentially ejects the small flying object 40 of the parachute device 4 disposed in the farthest position of the body unit 2 from the ground.

More specifically, first, the fall control part 16 selects, based on the detection result of the sensor part 12, the parachute device 4 disposed in the farthest position of the body unit 2 from the ground among the parachute devices 4, the small flying objects 40 of which are not ejected, and ejects the small flying object 40 of the selected parachute device 4 first.

That is, the fall control part 16 selects, based on the coordinate information 30 of the parachute devices 4_1 to 4_m stored in the memory unit 18 and the angle calculated by the angle calculating part 27, the parachute device 4 disposed in the farthest position of the body unit 2 from the ground out of the parachute devices 4_1 to 4_m and outputs the ignition signal to the selected parachute device 4 to thereby cause the parachute device 4 to eject the small flying object 40.

Thereafter, the fall control part 16 ejects, following the small flying object 40 ejected first, the small flying object 40 of the parachute device 4 disposed opposite to the parachute device 4, which ejected the small flying object 40 first, across the center part O of the body unit 2.

That is, the fall control part 16 selects, based on the coordinate information 30 of the parachute devices 4_1 to 4_m stored in the memory unit 18, the parachute device 4 disposed opposite to the parachute device 4, which ejected the small flying object 40 first, via the center part O of the body unit 2 and outputs the ignition signal to the selected parachute device 4 to thereby cause the parachute device 4 to eject a second small flying object 40.

Thereafter, the fall control part 16 sequentially ejects the remaining small flying objects 40 that are not ejected.

For example, the fall control part 16 ejects the small flying objects in one direction in order from the parachute device 4 adjacent to the parachute device 4 that ejected the small flying object 40 second.

More specifically, the fall control part 16 selects, starting from the parachute device 4 that ejected the small flying object 40 second, in clockwise or counterclockwise order viewed from the upper surface side of the body unit 2, the small flying objects 40 to be ejected third and thereafter and sequentially outputs the ignition signal.

When ejecting the second small flying object 40, when the parachute accommodating part 42 disposed opposite to the parachute accommodating part 42, which accommodates the small flying object 40 ejected first, across the center part O of the body unit 2 is absent, as in the case in which the fall control part 16 ejects the third and subsequent small flying objects 40 explained above, the fall control part 16 only has to eject the small flying objects 40 in one direction in order from the parachute device 4 adjacent to the parachute device 4 that ejected the small flying object 40 immediately before the ejection.

FIG. 8A to FIG. 8D are diagrams showing examples of parachute opening order of the parachutes in the flying apparatus 1 according to the first embodiment.

In the figures, numbers surrounded by circles added besides the parachute devices 4 indicate order of ejection of the small flying objects 40 of the parachute devices 4.

Figure 8A:
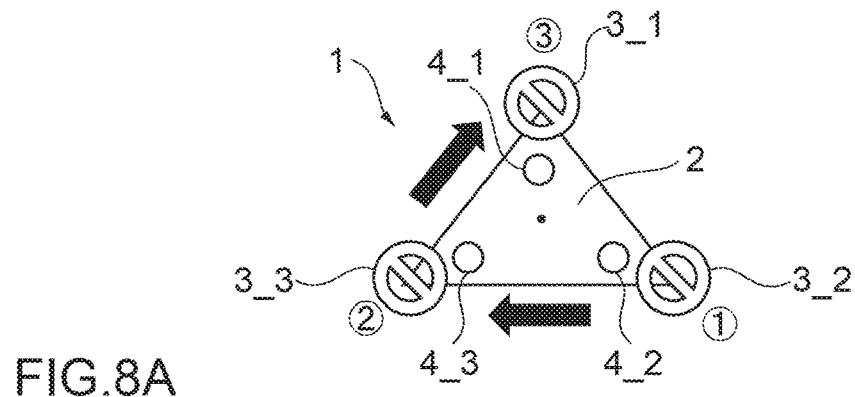
FIG. 8A A diagram showing an example of parachute opening order of parachutes in the flying apparatus according to the first embodiment.

First, as a first example, a case in which the small flying object 40 of the parachute device 4_2 is ejected first in, for example, a tricopter in which three parachute devices 4_1 to 4_3 are provided as shown in FIG. 8A is considered.

In this case, since the parachute device 4 disposed opposite to the parachute device 4_2, which ejected the small flying object 40 first, across the center part O of the body unit 2 is absent, the fall control part 16 ejects the small flying objects 40 clockwise in order from the parachute device 4_2 that ejected the small flying object 40 first. That is, in the case of the example shown in FIG. 8A, the fall control part 16 ejects the small flying objects 40 in the order of the parachute device 4_2, the parachute device 4_3, and the parachute device 4_1.

Figure 8B:
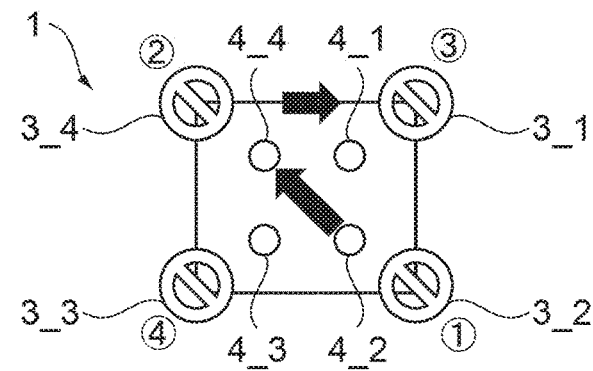
FIG. 8B A diagram showing an example of parachute opening order of parachutes in the flying apparatus according to the first embodiment.

As a second example, as shown in FIG. 8B, a case in which the small flying object 40 of the parachute device 4_2 is ejected first in, for example, a quadcopter in which four parachute devices 4_1 to 4_4 are provided as shown in FIG. 8B is considered.

In this case, since the parachute device 4_4 is disposed opposite to the parachute device 4_2, which ejected the small flying object 40 first, across the center part O of the body unit 2, the fall control part 16 ejects the small flying object 40 of the parachute device 4_4 second. Thereafter, the fall control part 16 sequentially ejects the small flying objects 40 clockwise starting from the parachute device 4_4 that ejected the small flying object 40 second. That is, in the case of the example shown in FIG. 8B, the fall control part 16 ejects the small flying objects 40 in the order of the parachute device 4_2, the parachute device 4_4, the parachute device 4_1, and the parachute device 4_3.

Figure 8C:
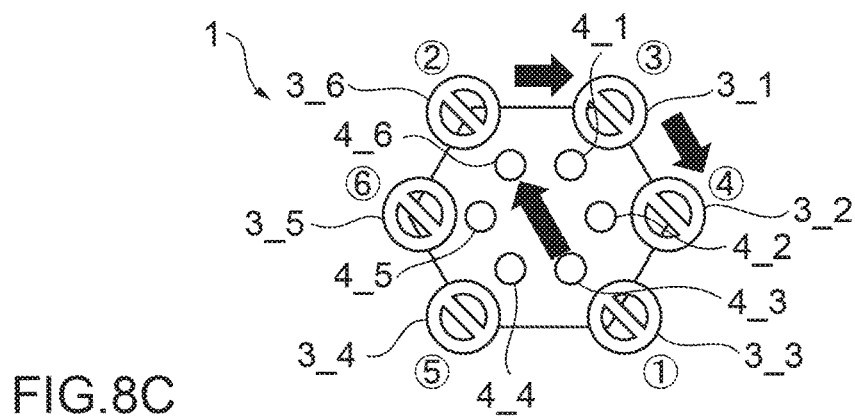
FIG. 8C A diagram showing an example of parachute opening order of parachutes in the flying apparatus according to the first embodiment.

As a third example, a case in which the small flying object 40 of the parachute device 4_3 is ejected first in, for example, a hexacopter in which six parachute devices 4_1 to 4_6 are provided as shown in FIG. 8C is considered.

In this case, since the parachute device 4_6 is disposed opposite to the parachute device 4_3, which ejected the small flying object 40 first, across the center part O of the body unit 2, the fall control part 16 ejects the small flying object 40 of the parachute device 4_6 second. Thereafter, the fall control part 16 sequentially ejects the small flying objects 40 clockwise starting from the parachute device 4_6 that ejected the small flying object 40 second. That is, in the case of the example shown in FIG. 8C, the fall control part 16 ejects the small flying objects 40 in the order of the parachute device 4_3, the parachute device 4_6, the parachute device 4_1, the parachute device 4_2, the parachute device 4_4, and the parachute device 4_5.

Figure 8D:
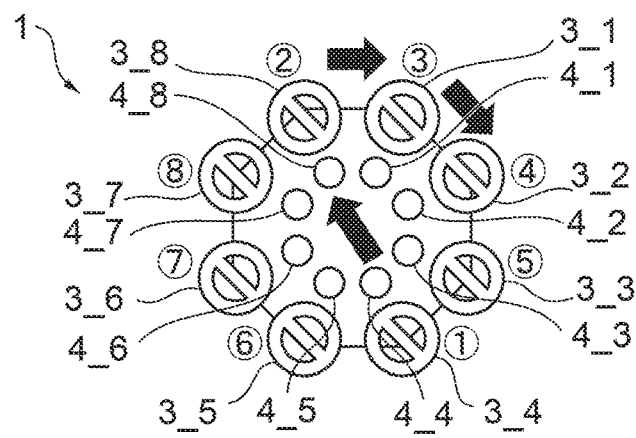
FIG. 8D A diagram showing an example of a parachute opening order of parachutes in the flying apparatus according to the first embodiment.

As a fourth example, a case in which the small flying object 40 of the parachute device 4_4 is ejected first in, for example, an octocopter in which eight parachute devices 4_1 to 4_8 are provided as shown in FIG. 8D is considered.

In this case, since the parachute device 4_8 is disposed opposite to the parachute device 4_4, which ejected the small flying object 40 first, across the center part O of the body unit 2, the fall control part 16 ejects the small flying object 40 of the parachute device 4_8 second. Thereafter, the fall control part 16 sequentially ejects the small flying objects 40 clockwise starting from the parachute device 4_8 that ejected the small flying object 40 second. That is, in the case of the example shown in FIG. 8D, the fall control part 16 ejects the small flying objects 40 in the order of the parachute device 4_4, the parachute device 4_8, the parachute device 4_1, the parachute device 4_2, the parachute device 4_3, the parachute device 4_5, the parachute device 4_6, and the parachute device 4_7.

Thereafter, a flow of the fall preparation processing by the fall control part 16 is explained in detail.

Figure 9:
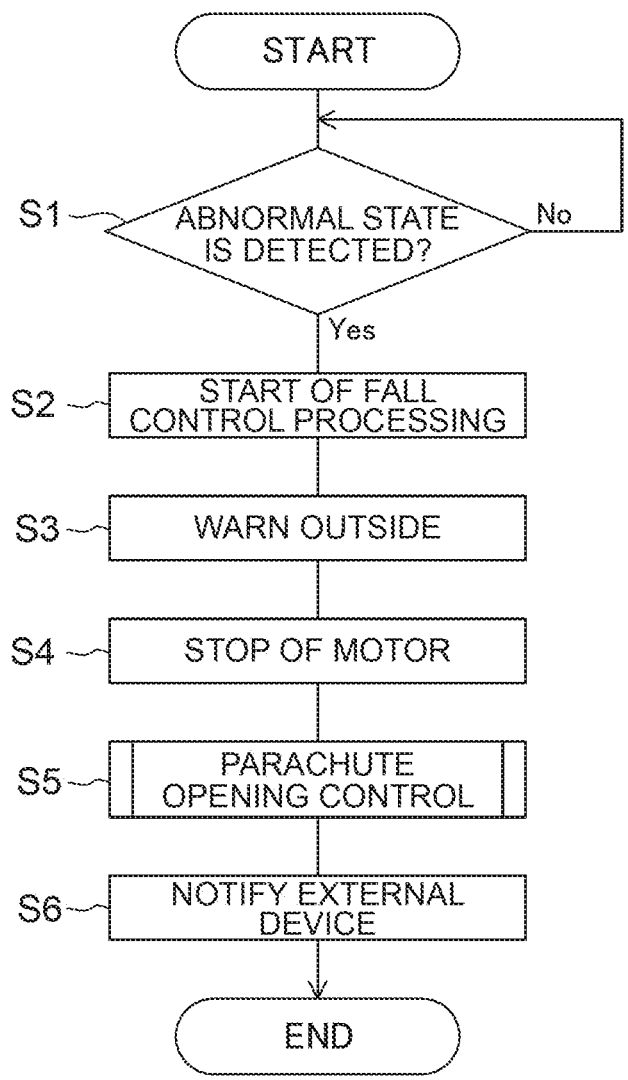
FIG. 9 A flowchart showing a flow of fall preparation processing by the flying apparatus according to the first embodiment.

FIG. 9 is a flowchart showing a flow of the fall preparation processing by the flying apparatus 1 according to the first embodiment.

In a state in which the flying apparatus 1 is flying, the fall control part 16 determines whether an abnormal state is detected by the abnormality detecting part 15 (step S1). When an abnormal state is not detected by the abnormality detecting part 15 in step S1, the fall control part 16 does not start the fall preparation processing and monitors presence or absence of detection of an abnormality by the abnormality detecting part 15 while continuously performing control such that the flying apparatus 1 stably flies.

On the other hand, when an abnormal state is detected by the abnormality detecting part 15 in step S1, the fall control part 16 starts the fall control processing (step S2). For example, when the body (the body unit 2) of the flying apparatus 1 is tilted by strong wind more than the tilt threshold 29 continues for a predetermined period, the abnormality detecting part 15 notifies a signal indicating that the abnormality is detected to the fall control part 16. When receiving the signal, the fall control part 16 determines that the flying apparatus 1 is likely to fall and starts fall control processing.

In the fall control processing, first, the fall control part 16 controls the informing device 5 to inform the outside that the flying apparatus 1 is in a dangerous state (step S3). For example, the fall control part 16 drives the light source forming the informing device 5 to generate flashing light. The fall control part 16 drives the sound generating device forming the informing device 5 to output warning sound or announcement for urging evacuation.

Thereafter, the fall control part 16 stops the motors 31 (step S4). Specifically, the fall control part 16 instructs the motor driving parts 13_1 to 13_n to stop the motors 31. Consequently, the motors 31 of the flying apparatus 1 stop and the rotation of the propellers 35 stops.

Note that the instruction to the motor driving parts 13_1 to 13_n may be directly performed from the fall control part 16 to the motor driving parts 13_1 to 13_n or may be indirectly performed from the fall control part 16 to the motor driving parts 13_1 to 13_n via the flight control part 14.

Thereafter, the fall control part 16 performs parachute opening control (step S5).

Figure 10:
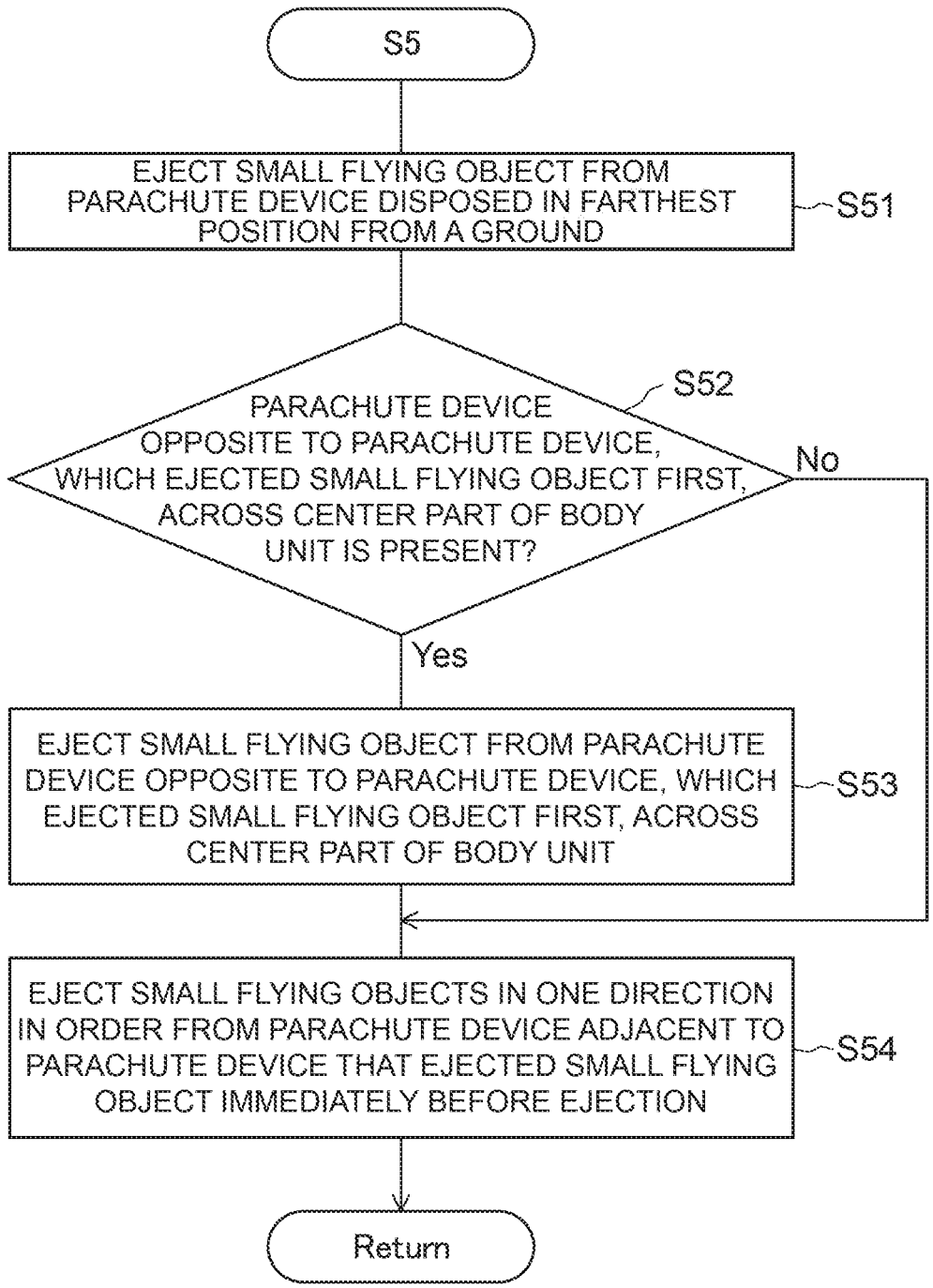
FIG. 10 A flowchart showing a flow of parachute opening control (step S5).

FIG. 10 is a flowchart showing a flow of the parachute opening control (step S5). A flow of processing of the parachute opening control (step S5) is explained using the flying apparatus 1 shown in FIG. 1 as an example.

In step S5, first, the fall control part 16 selects the parachute device 4 disposed in the farthest position of the body unit 2 from the ground and ejects the small flying object 40 from the selected parachute device 4 according to the method described above (step S51). In FIG. 1, it is assumed that the small flying object 40 is ejected from the parachute device 4_1 first.

Thereafter, the fall control part 16 determines, based on the coordinate information 30 of the parachute devices 4 stored in the memory unit 18, the parachute device 4 disposed opposite to the parachute device 4, which ejected the small flying object 40 in step S51, across the center part O of the body unit 2 is present (step S52).

When the parachute device 4 disposed opposite to the parachute device 4, which ejected the small flying object 40 in step S51, across the center part O of the body unit 2 is absent in step S52, the fall control part 16 shifts to step S54 explained below.

On the other hand, when the parachute device 4 disposed opposite to the parachute device 4, which ejected the small flying object 40 in step S51, across the center part O of the body unit 2 is present in step S52, the fall control part 16 ejects the small flying object 40 from the parachute device 4 (step S53).

In the case of the example explained above, since the parachute device 4_3 is disposed opposite to the parachute device 4_1, which ejected the small flying object 40 in step S51, across the center part O of the body unit 2, the fall control part 16 ejects the second small flying object 40 from the parachute device 4_3.

Thereafter, the fall control part 16 ejects the small flying objects 40 in order from the parachute device 4 adjacent to the parachute device 4 that ejected the small flying objects 40 immediately before the ejection (step S54).

In the case of the example explained above, since the second small flying object 40 is ejected from the parachute device 4_3 in the immediately preceding step S53, the fall control part 16 ejects the small flying objects 40 in one direction in order from the parachute device 4_4 adjacent to the parachute device 4_3. In this case, the fall control part 16 ejects a third small flying object 40 from the parachute device 4_4 and ejects a fourth small flying object 40 from the parachute device 4_2.

According to the processing procedure explained above, the parachute opening control (step S5) is performed.

Figure 11:
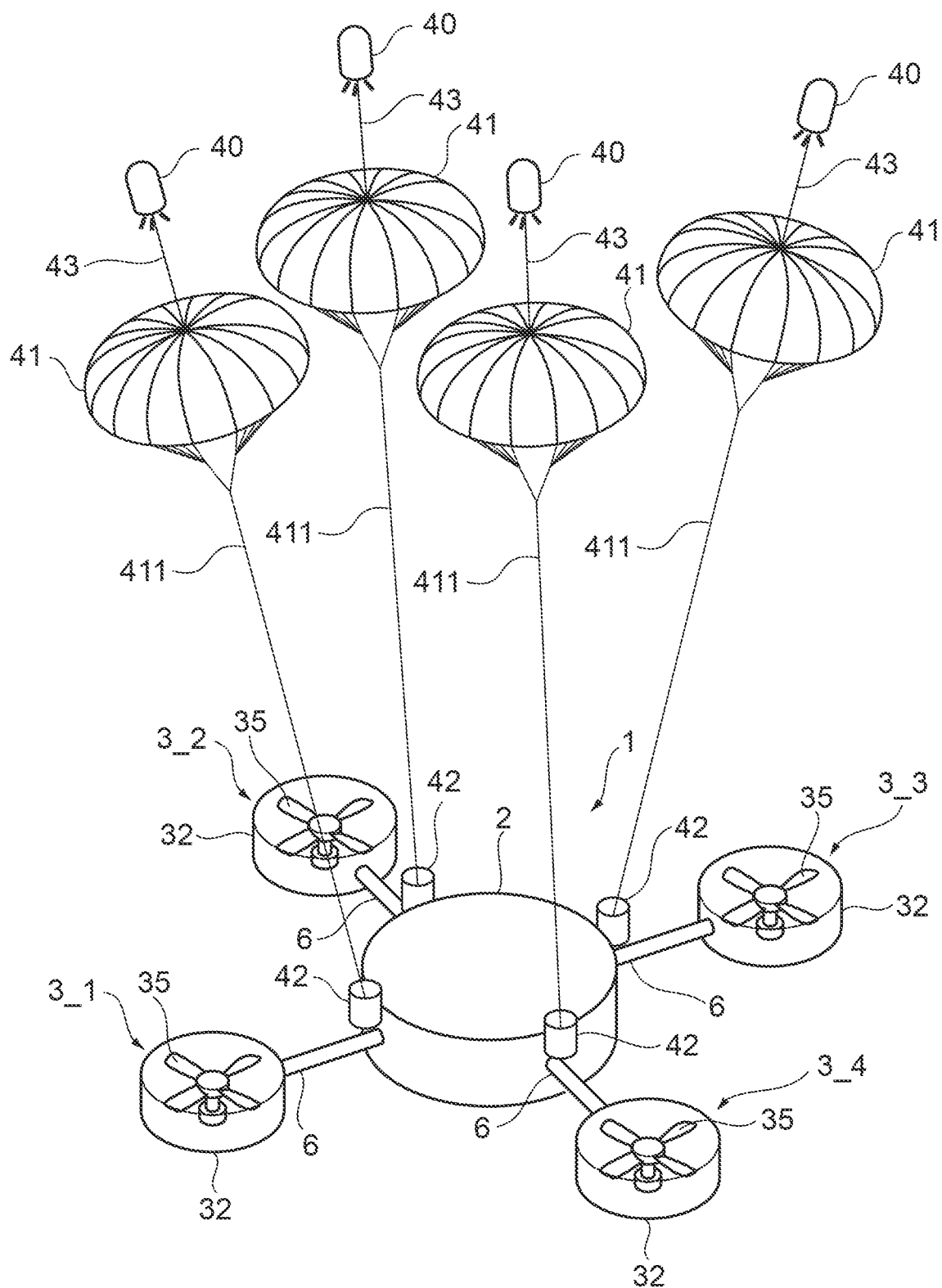
FIG. 11 A diagram schematically showing the flying apparatus according to the first embodiment in the state in which parachutes are opened.

FIG. 11 is a diagram schematically showing the flying apparatus 1 in a state in which the parachutes 41 are opened.

For example, when the small flying objects 40 are ejected in the order explained above in the flow of FIG. 10, the small flying objects 40 are ejected and the parachutes 41 are opened in the order of the parachute device 4_1, the parachute device 4_3, the parachute device 4_4, and the parachute device 4_2. Consequently, the flying apparatus 1 slowly falls toward the ground.

In FIG. 9, after the parachute opening control (step S5), the fall control part 16 notifies, via the communication part 17, the external device 9 that the flying apparatus 1 has fallen (step S6).

The notification to the external device 9 may be performed at any timing after the start of the fall control processing (step S2). For example, the notification may be performed after the flying apparatus 1 is landed or may be performed immediately after the start of the fall control processing (step S2).

When notifying the external device 9 that the flying apparatus 1 has fallen, the fall control part 16 may notify position information of a falling place acquired by a GPS receiver together with the fall of the flying apparatus 1.

According to the procedure explained above, the fall control processing for the flying apparatus 1 is performed.

As explained above, with the flying apparatus 1 according to the first embodiment, the fall control part 16 ejects the small flying objects 40 coupled to the parachutes 41 from the parachute accommodating parts 42 according to the detection of the abnormality during the flight by the abnormality detecting part 15. Therefore, even when the flying apparatus 1 falls into an autonomous flight impossible state, it is possible to open the parachutes 41 and cause the flying apparatus 1 to slowly fall. Consequently, it is possible to improve safety during the fall of the flying apparatus 1.

With the flying apparatus 1 according to the first embodiment, since the parachutes 41 are towed by the small flying objects 40, the parachutes 41 can be surely ejected from the parachute accommodating parts 42.

In the flying apparatus 1 according to the first embodiment, the small flying object 40 includes the plurality of nozzles 405 respectively coupled to the gas emission holes 404, which are formed in the housing 400, and provided to be inclined with respect to the axis P of the housing 400.

Consequently, as explained above, it is possible to linearly eject the small flying object 40 in the axial direction of the parachute accommodating part 42 while rotating the small flying object 40. Consequently, since the parachute 41 can be towed with a stronger force, it is possible to bring the ejected parachute 41 into a more easily openable state.

With the flying apparatus 1 according to the first embodiment, the fall control part 16 ejects the small flying objects 40 of the respective plurality of parachute devices 4 while staggering the ejections in time. Therefore, it is possible to perform control for further reducing falling speed of the flying apparatus 1.

Specifically, the fall control part 16 preferentially ejects the small flying object 40 of the parachute device 4 disposed in the farthest position of the body unit 2 from the ground. Consequently, it is possible to bring the body of the flying apparatus 1 to a near horizontal state before the parachute 41 opens. Therefore, the posture of the flying apparatus 1 during the fall is stabilized. It is possible to further reduce the falling speed of the flying apparatus 1.

More specifically, the fall control part 16 selects, based on the detection result of the sensor part 12, the parachute device 4 disposed in the farthest part of the body unit 2 from the ground among the parachute devices 4 from which the small flying objects 40 are not ejected and ejects the small flying object 40 of the selected parachute device 4 first.

Figure 12A:
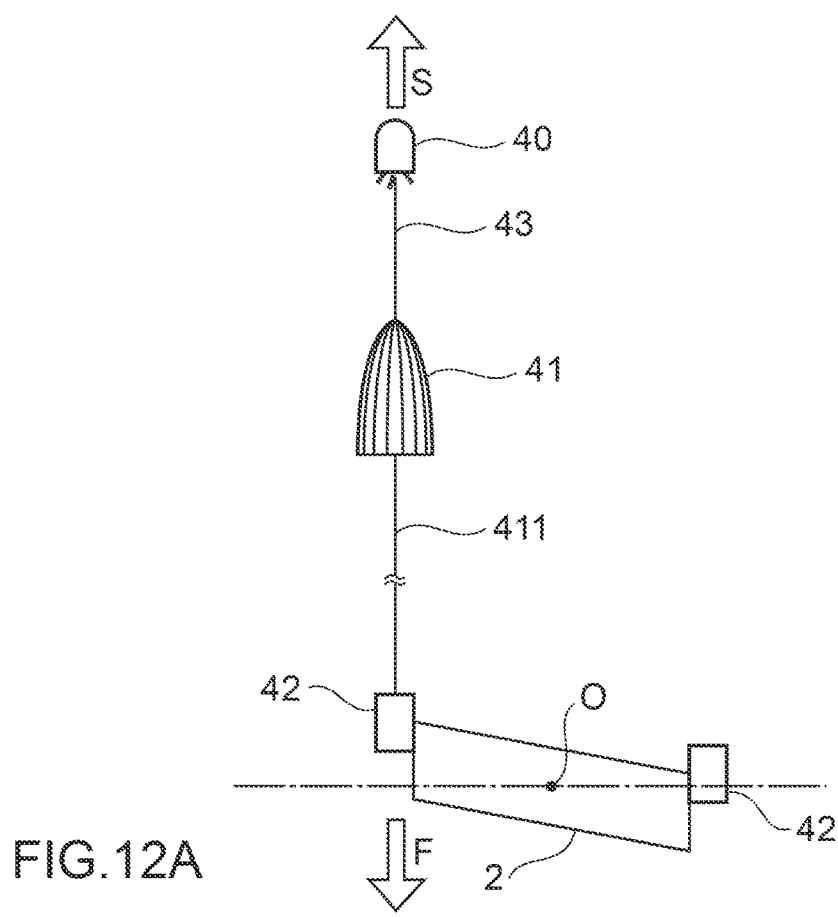
FIG. 12A A diagram schematically showing a state of a body unit during ejection of the small flying object.
Figure 12B:
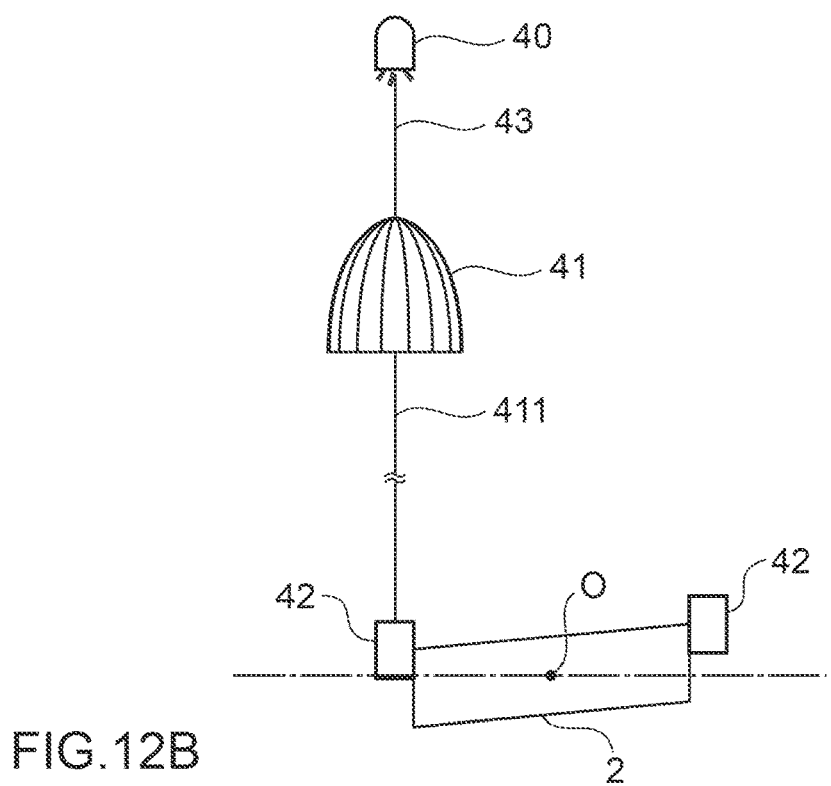
FIG. 12B A diagram schematically showing the state of the body unit during the ejection of the small flying object.

Consequently, as shown in FIG. 12A, a force F in the opposite direction of an ejecting direction S of the small flying object 40 is applied to the farthest side of the body unit 2 from the ground by reaction at the time when a first small flying object 40 is ejected. As a result, as shown in FIG. 12B, it is possible to bring the body unit 2 into a state closer to a horizontal. In this state, when a second small flying object 40 is ejected, the parachute 41 towed by the small flying object 40 can be launched in a direction more perpendicular to the ground. Therefore, the parachute 41 towed by the second small flying object 40 easily involves air. It is possible to more quickly open the parachute 41. As a result, a force in a direction toward the ground applied to the body unit 2 can be reduced. A falling time of the flying apparatus 1 can be further increased. Therefore, it is possible to further improve safety during the fall of the flying apparatus 1.

The fall control part 16 ejects the small flying object 40 of the parachute device 4 disposed opposite to the parachute device 4, which ejected the small flying object 40 first, across the center part O of the body unit 2, following the small flying object 40 ejected first.

Consequently, in a flying apparatus in which an even number of parachute accommodating parts 42 are disposed in a form surrounding the center part O of the body unit 2, effects explained below can be expected.

First, as explained above, when the first small flying object 40 is ejected, a force is applied to the body unit 2 by the reaction of the ejection in a direction in which the body unit 2 becomes horizontal. However, when the force is large, the body unit 2 is likely to tilt to the opposite side. In this case, by ejecting, second, the small flying object 40 of the parachute device 4 disposed opposite to the parachute device 4, which ejected the small flying object 40 first, across the center part O of the body unit 2, a force can be applied in a direction in which the body unit 2 is returned to the horizontal state by the reaction of the ejection of the second small flying object 40. Consequently, since the posture of the flying apparatus 1 during the fall can be further stabilized, it is possible to further increase the falling time of the flying apparatus 1.

In this way, in the flying apparatus 1 including a set of the parachute accommodating parts 42 disposed opposite to one another across the center part O of the body unit 2, it is possible to further improve the safety during the fall.

In the flying apparatus 1 according to the first embodiment, when the parachute device 4 that ejects the small flying object 40 first is selected, calculation for selecting the parachute device 4 disposed in the farthest position of the body unit 2 from the ground is performed using information concerning a tilt of the body unit 2 detected by the sensor part 12. The parachute devices 4 that eject the small flying objects 40 second and thereafter are determined based on a positional relation between the parachute devices 4 and the parachute devices 4 ejected the small flying objects 40 immediately before the ejection.

Consequently, the calculation for selecting the parachute devices 4 that eject the small flying objects 40 second and thereafter executed by the fall control part 16 (the program processing device) has a smaller load than calculation for selecting the parachute device 4 that ejects the small flying object 40 first. Therefore, the parachute devices 4 that should eject the small flying objects 40 second and thereafter can be determined in a shorter time. Consequently, it is possible to more quickly eject the second and subsequent small flying objects. It is possible to reduce a time until all the parachutes 41 are opened.

Second Embodiment

Figure 13:
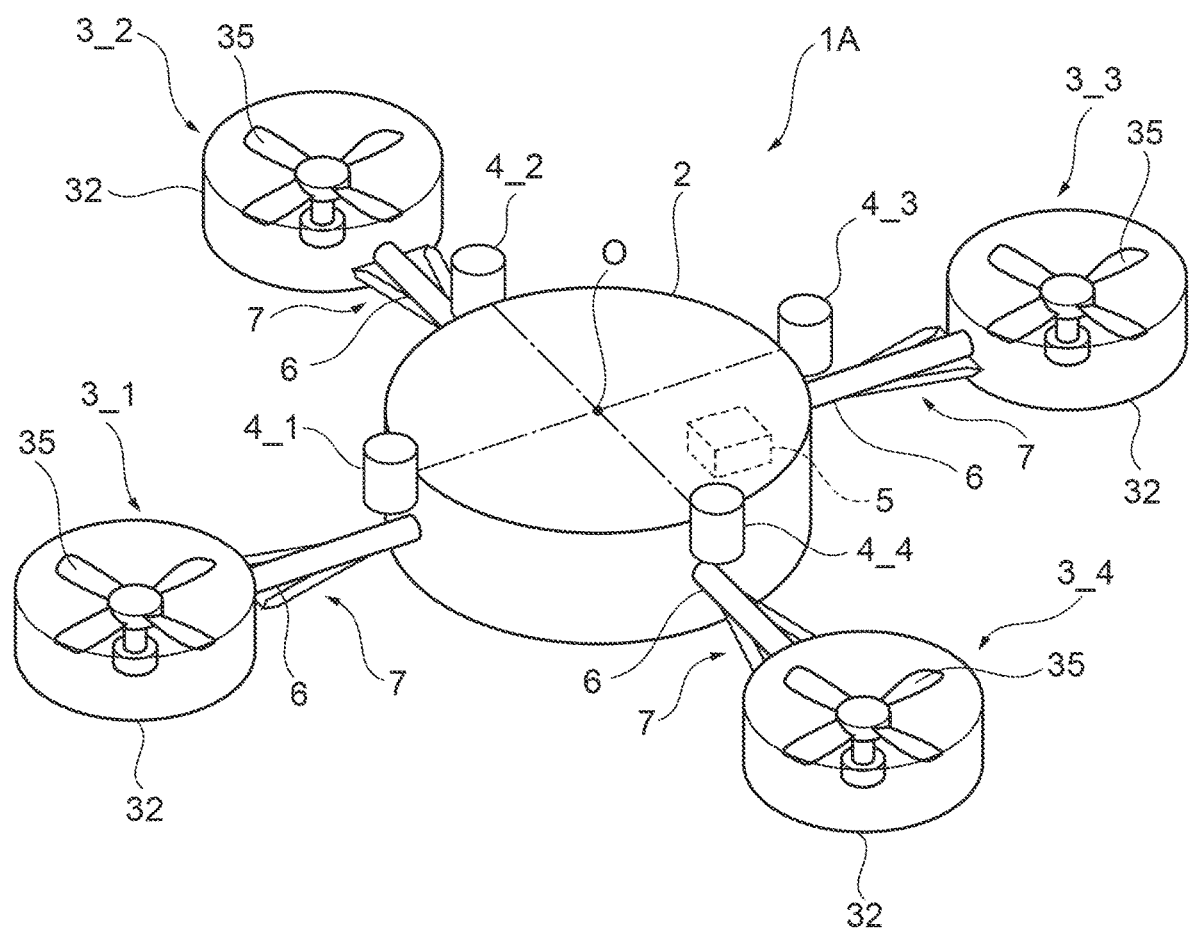
FIG. 13 A diagram schematically showing an exterior of a flying apparatus according to a second embodiment of the present invention.

FIG. 13 is a diagram schematically showing an exterior of a flying apparatus according to a second embodiment of the present invention.

A flying apparatus 1A shown in FIG. 13 is different from the flying apparatus 1 according to the first embodiment in that the flying apparatus 1A further includes resistance wings 7 in addition to the parachute accommodating parts 42 as functional parts for controlling a fall of a body and is the same as the flying apparatus 1 according to the first embodiment in the other points.

As shown in FIG. 13, the flying apparatus 1A includes a plurality of resistance wings 7. The resistance wings 7 are respectively provided on the lower surfaces (the ground side during flight of the flying apparatus 1A) or the upper surfaces (the opposite side of the ground during the flight of the flying apparatus 1A) of the arm parts 6, for example.

Figure 14A:
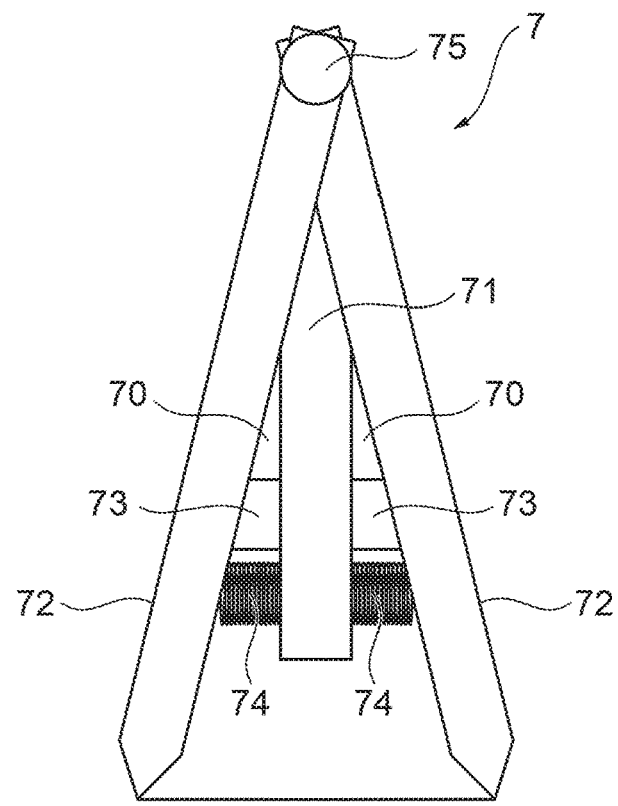
FIG. 14A A diagram schematically showing a configuration of a resistance wing of the flying apparatus according to the second embodiment.
Figure 14B:
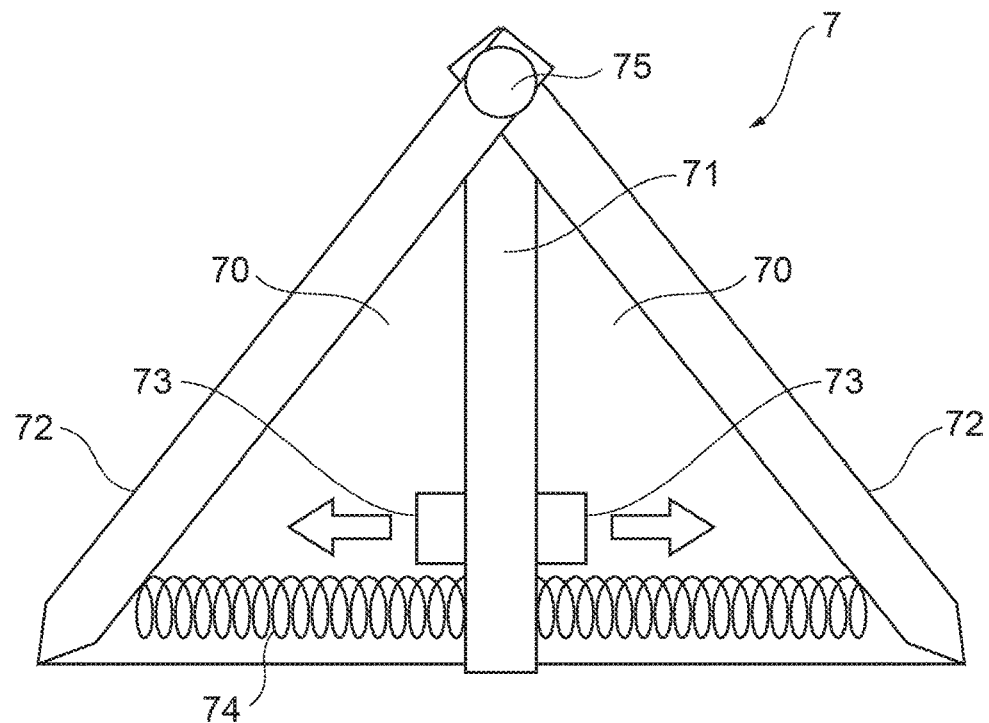
FIG. 14B A diagram schematically showing the configuration of the resistance wing of the flying apparatus according to the second embodiment.

FIG. 14A and FIG. 14B are diagrams schematically showing a configuration of the resistance wing 7.

In FIG. 14A, a configuration at the time when the resistance wing 7 is closed is shown. In FIG. 14B, a configuration at the time when the resistance wing 7 is opened is shown.

As shown in FIG. 14A and FIG. 14B, the resistance wing 7 includes wing parts 70, a support frame part 71, movable frame parts 72, opening and closing control parts 73, spring members 74, and a supporting member 75.

The support frame part 71 is a component for supporting the constituent components of the resistance wing 7 and is formed from, for example, a metal material.

The wing parts 70 are components for receiving air during a fall of the flying apparatus 1A. The wing parts 70 are configured to be foldable. The wing parts 70 are formed from, for example, a nylon texture (for example, Ultra-SilR (registered trademark) nylon) or cellulose nanofiber.

The wing parts 70 are respectively provided on both sides across the support frame part 71. The shape of the wing parts 70 has, for example, a triangular shape. Note that the wing parts 70 only have to have a shape that can efficiently receive the air during the fall and are not limited to the triangular shape. For example, the shape of the wing parts 70 may be a fan shape. One side forming an outer peripheral part of the wing part 70 is fixed to the support frame part 71 and another side is fixed to the movable frame part 72.

The movable frame parts 72 are one of components for opening and closing the wing parts 70. The supporting member 75 is a component that supports the movable frame parts 72 to be turnable with respect to the support frame part 71.

The spring members 74 are one of the components for opening and closing the wing parts 70. The spring members 74 are, for example, compression coil springs. One ends in an extending direction of the spring members 74 are fixed to the support frame part 71. Another ends in the extending direction of the spring members 74 are fixed to the movable frame parts 72. The spring members 74 are disposed such that a compression load is applied to the wing parts 70 when the wing parts 70 are closed.

The opening and closing control parts 73 are one of the components for opening and closing the wing parts 70. The opening and closing control parts 73 control the opening and closing of the wing parts 70 according to a control signal from a fall control part 16A. The opening and closing control parts 73 are, for example, solenoids.

The opening and closing control parts 73 fix the movable frame parts 72 in a state in which the movable frame parts 72 are brought close to the support frame part 71 during normal flight of the flying apparatus 1A. Consequently, the wing parts 70 come into a closed state and the compression load is applied to the spring members 74.

The opening and closing control parts 73 unfix the movable frame parts 72 when the flying apparatus 1A falls into an abnormal state during the flight and a control signal for instructing opening of the resistance wings 7 is output from the fall control part 16A. Consequently, the compression load applied to the spring members 74 is released, the movable frame parts 72 turn with an elastic force of the spring members 74, and the wing parts 70 can be opened.

Figure 15:
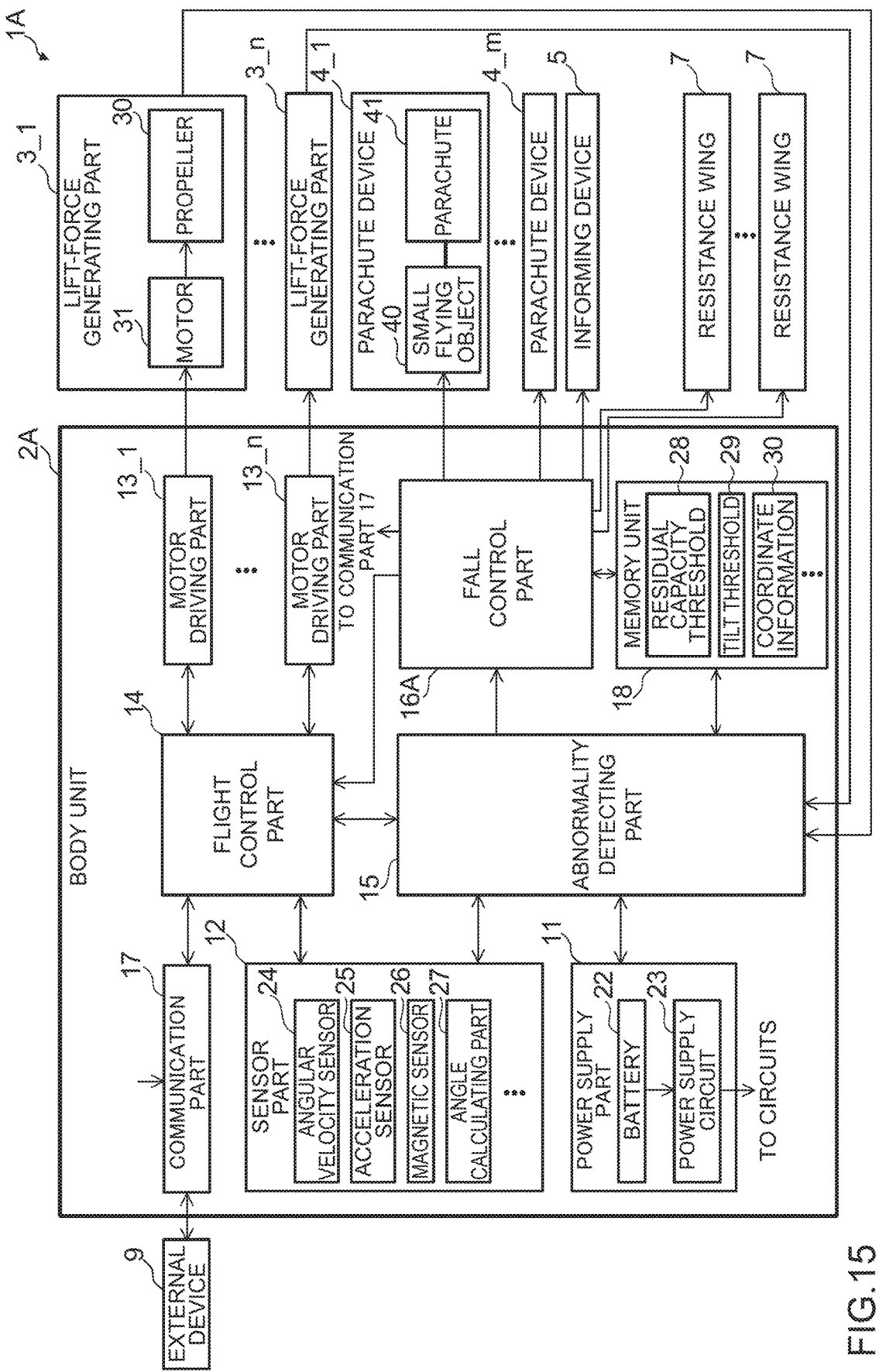
FIG. 15 A functional block diagram of the flying apparatus according to the second embodiment.

FIG. 15 is a functional block diagram of the flying apparatus 1A according to the second embodiment.

The fall control part 16A performs, according to detection of an abnormality by the abnormality detecting part 15, control for opening the resistance wings 7. Specifically, when an abnormality is detected by the abnormality detecting part 15, the fall control part 16A outputs a control signal for instructing opening of the resistance wings 7 to the opening and closing control parts 73 of the resistance wings 7.

Figure 16:
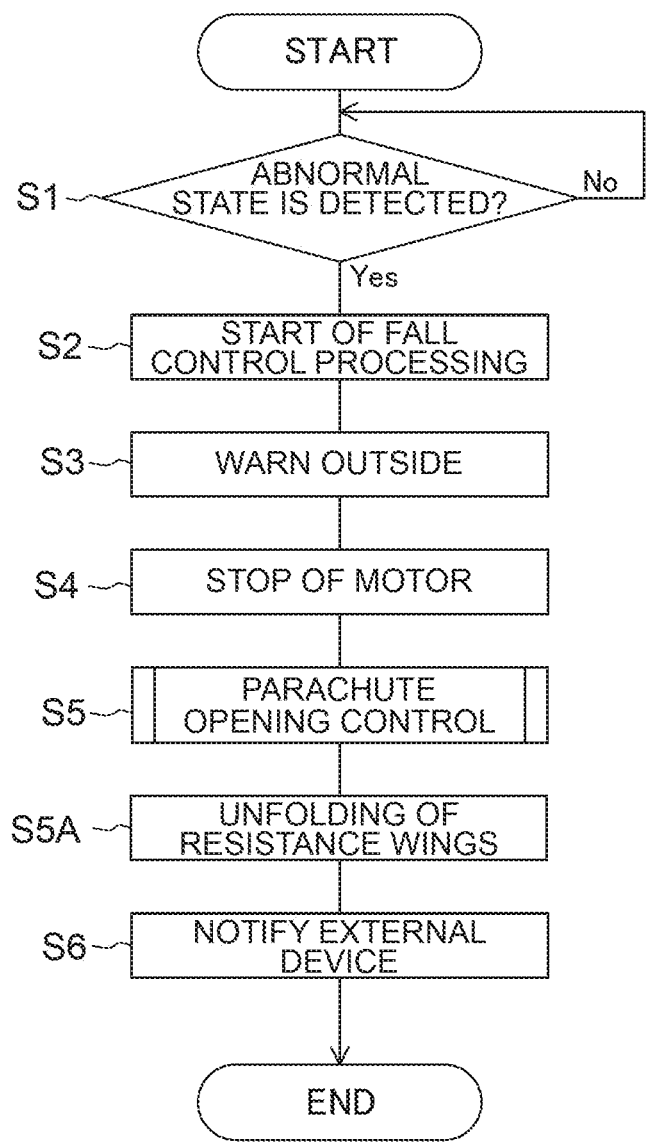
FIG. 16 A flowchart showing a flow of fall preparation processing by the flying apparatus according to the second embodiment.

FIG. 16 is a flowchart showing a flow of fall preparation processing by the flying apparatus 1A according to the second embodiment 2.

In the figure, a processing procedure from step S1 to step S4 is the same as the flow of the fall preparation processing by the flying apparatus 1 according to the first embodiment. Therefore, explanation about the processing procedure is omitted. Note that, in a stage before the fall preparation processing is started, it is assumed that the wing parts 70 of the resistance wings 7 are closed by the opening and closing control parts 73.

In the fall preparation processing by the flying apparatus 1A, after the motors 31 stop in step S4, the fall control part 16A executes parachute opening control (step S5).

Further, the fall control part 16A unfolds the resistance wings 7 (step S5A). Specifically, the fall control part 16A outputs a control signal for instructing opening of the resistance wings 7 to the opening and closing control parts 73 of the resistance wings 7. Consequently, the resistance wings 7 open according to the principle explained above.

The unfolding of the resistance wings 7 may be performed in parallel to the parachute opening control (step S5) or may be performed at timing before or after the parachute opening control (step S5) is executed.

Figure 17:
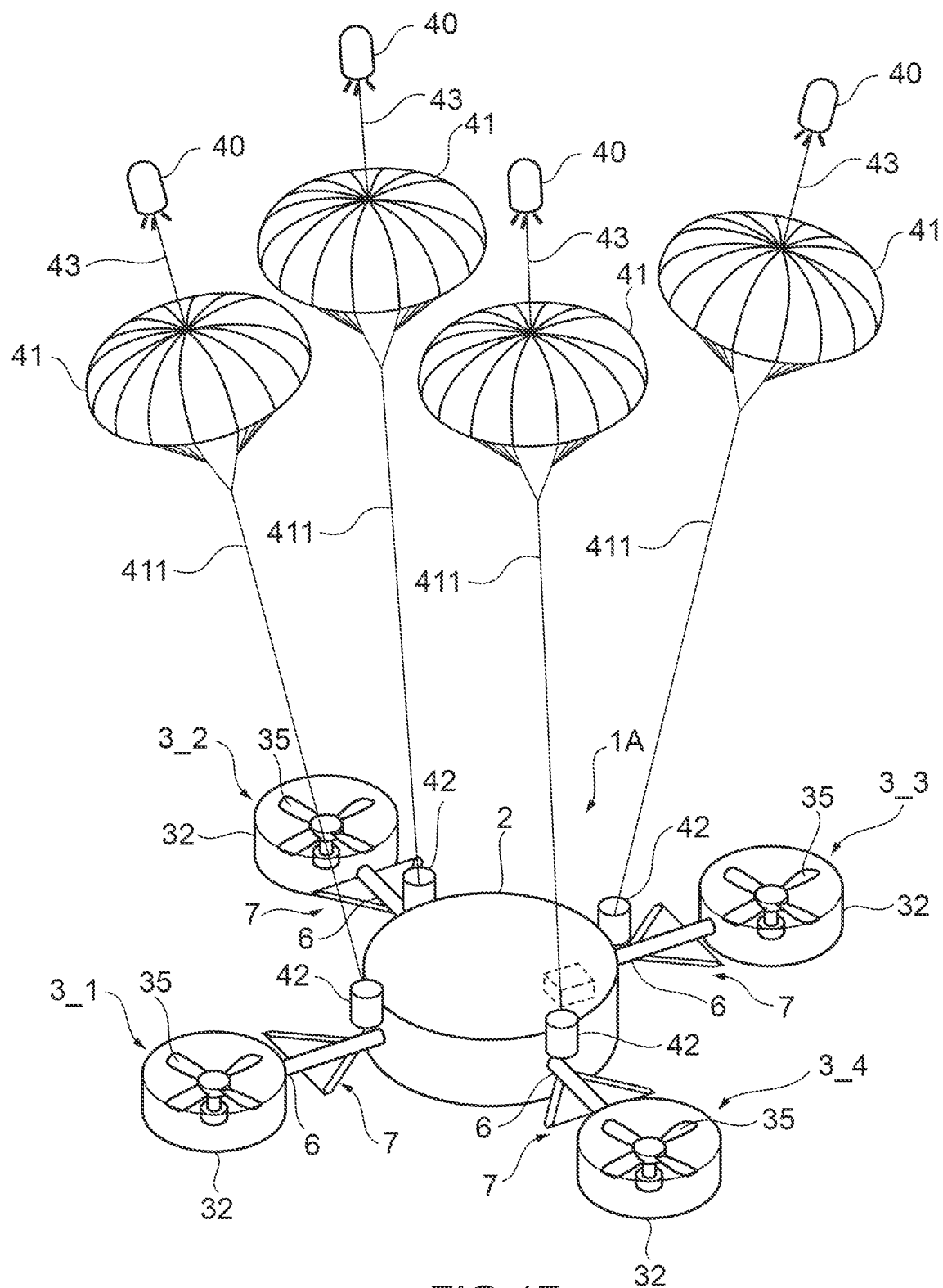
FIG. 17 A diagram schematically showing the flying apparatus according to the second embodiment in a state in which parachutes and resistance wings are opened.

FIG. 17 is a diagram schematically showing the flying apparatus 1A according to the second embodiment in a state in which the parachutes 41 and the resistance wings 7 are opened.

As shown in FIG. 17, the parachutes 41 and the resistance wings 7 are opened when the flying apparatus 1A falls, whereby the parachutes 41 and the resistance wings 7 receive air resistance. Therefore, the flying apparatus 1A slowly falls toward the ground.

Thereafter, as in the flying apparatus 1 according to the first embodiment, the fall control part 16A notifies the external device 9 that the flying apparatus 1A has fallen (step S6).

As explained above, the flying apparatus 1A according to the second embodiment further includes the openable and closable resistance wings 7 in addition to the parachute accommodating parts 42 and performs control for unfolding the resistance wings 7 according to the detection of the abnormality by the abnormality detecting part 15. Consequently, since not only the parachutes 41 but also the resistance wings 7 receive the air resistance during the fall of the flying apparatus 1A, it is possible to further reduce falling speed of the flying apparatus 1A. It is possible to improve safety during the fall of the flying apparatus 1A.

<<Modifications of the Parachute Device 4>>

Modifications of the parachute device 4 of the flying apparatus 1 and 1A according to the first and second embodiments of the present invention are explained below.

(1) First Modification

Figure 18A:
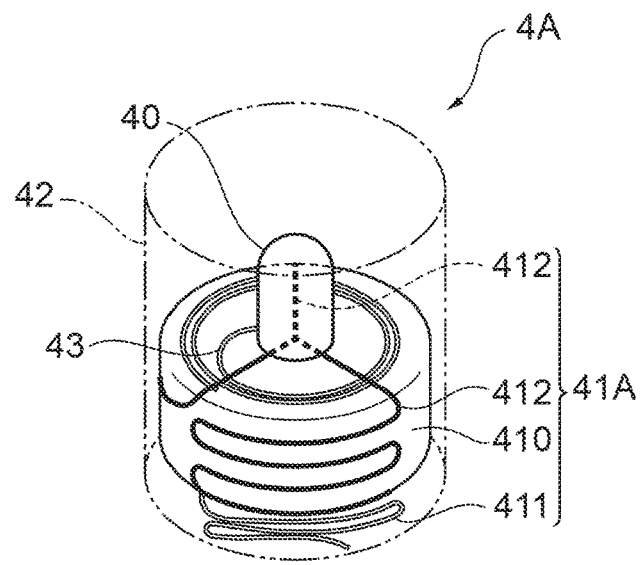
FIG. 18A A diagram schematically showing a configuration of a parachute device according to a first modification.
Figure 18B:
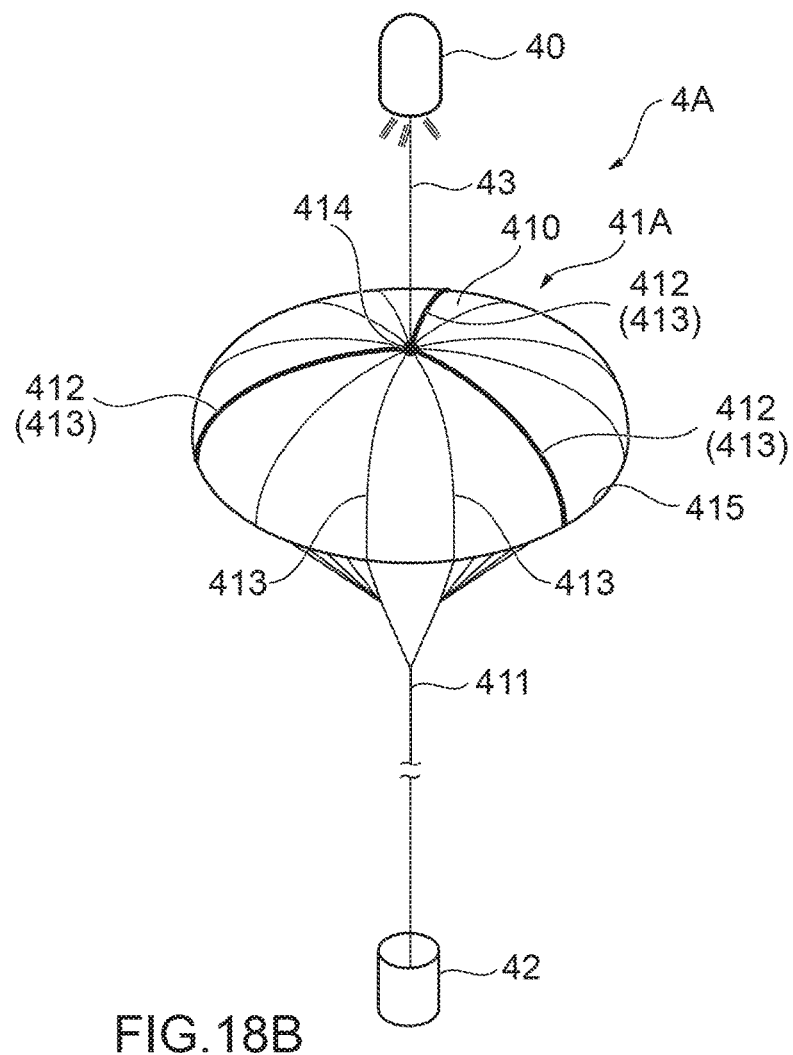
FIG. 18B A diagram schematically showing the configuration of the parachute device according to the first modification in a state in which a parachute is opened.

FIG. 18A and FIG. 18B are diagrams schematically showing a configuration of a parachute device 4A according to a first modification. In FIG. 18A, the parachute device 4A before a parachute 41A is ejected is shown. In FIG. 18B, the parachute device 4A in a parachute opened state after the parachute 41A is ejected is shown.

The parachute 41A of the parachute device 4A according to the first modification further includes bar-like elastic members 412 in addition to the same components as the components of the parachute 41 according to the first embodiment. For example, the elastic members 412 are formed from a bar-like metal material and, more preferably, formed by a bar-like shape memory alloy.

As shown in FIG. 18B, the elastic members 412 are provided from a top part 414 of the parachute body 410 toward an edge part 415 of the parachute body 410. For example, in the parachute body 410, the elastic members 412 extend along seams 413 of cells forming the parachute body 410.

Note that the elastic members 412 only have to be laid between the top part 414 and the edge part 415 and do not have to be provided entirely from the top part 414 to the edge part 415. For example, the elastic members 412 may extend from the top part 414 to a middle point between the top part 414 and the edge part 415.

The number of the elastic members 412 provided in the parachute body 410 is not particularly limited but is preferably at least three. When three or more elastic members 412 are provided, it is preferable to dispose the elastic members 412 at equal intervals along the circumferential direction of the parachute body 410.

As shown in FIG. 18A, before the parachute 41A is ejected, the elastic members 412 are accommodated in the parachute accommodating part 42 in a state in which a compression load is applied to the elastic members 412.

On the other hand, as shown in FIG. 18B, when the parachute 41A is ejected from the parachute accommodating part 42, the compression load applied to the elastic members 412 is released. Consequently, an elastic force of the elastic members 412 assists unfolding of the parachute body 410. The parachute body 410 can be quickly opened.

As explained above, with the parachute 41A of the parachute device 4A according to the first modification, the parachute body 410 can be more quickly opened by the bar-like elastic members 412 extending between the top part 414 of the parachute body 410 and the edge part 415 of the parachute body 410. Consequently, it is possible to further reduce the falling speed of the flying apparatus 1A. It is possible to improve the safety during the fall of the flying apparatus 1A.

At least three elastic members 412 are provided in the parachute body 410 and the elastic members 412 are disposed at equal intervals along the circumferential direction of the edge part 415 of the parachute body 410. Consequently, it is possible to more equally expand the parachute body 410. It is possible to further reduce the falling speed of the flying apparatus 1.

(2) Second Modification

Figure 19A:
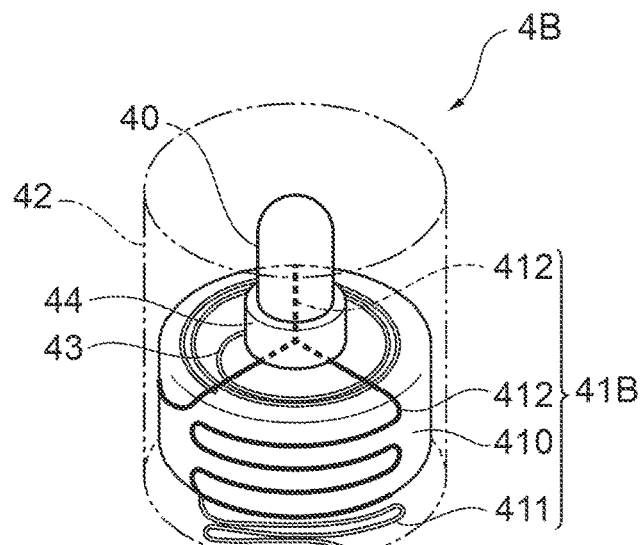
FIG. 19A A diagram schematically showing a configuration of a parachute device according to a second modification.
Figure 19B:
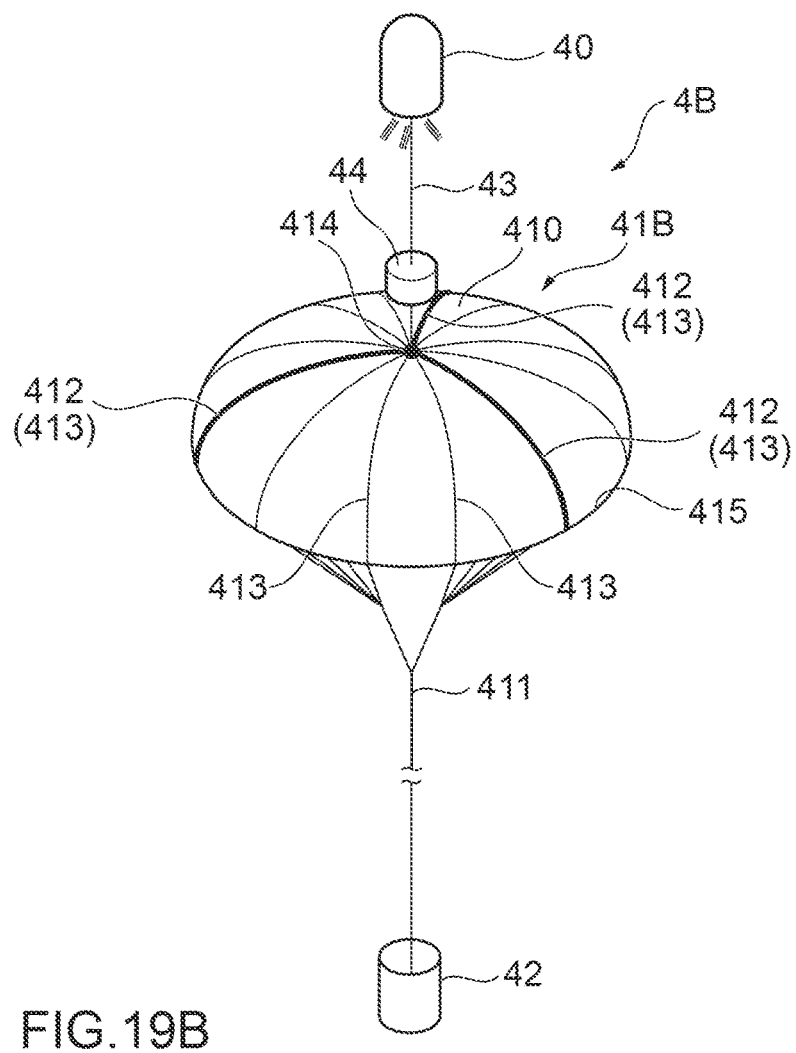
FIG. 19B A diagram schematically showing the configuration of the parachute device according to the second modification in a state in which a parachute is opened.

FIG. 19A and FIG. 19B are diagrams schematically showing a configuration of a parachute device 4B according to a second modification. In FIG. 19A, the parachute device 4B before a parachute 41B is ejected is shown. In FIG. 19B, the parachute device 4B in a parachute opened state after the parachute 41B is ejected is shown.

The parachute 41B of the parachute device 4B according to the second modification further includes a parachute opening control device 44 that controls unfolding of a parachute body in addition to the same components as the components of the parachute device 4A according to the first modification explained above.

The parachute opening control device 44 applies a compression load to the elastic members 412 to deform the elastic members 412 in a state before the small flying object 40 is ejected, that is, a state in which the parachute 41B is accommodated in the parachute accommodating part 42. Specifically, when a tensile force of the wire 43 coupling the small flying object 40 and the parachute body 410 is lower than a predetermined level, the parachute opening control device 44 applies the compression load to the elastic members 412 to deform the elastic members 412. On the other hand, when the tensile force of the wire 43 exceeds the predetermined level, the parachute opening control device 44 releases the compression load applied to the elastic members 412.

Figure 20A:
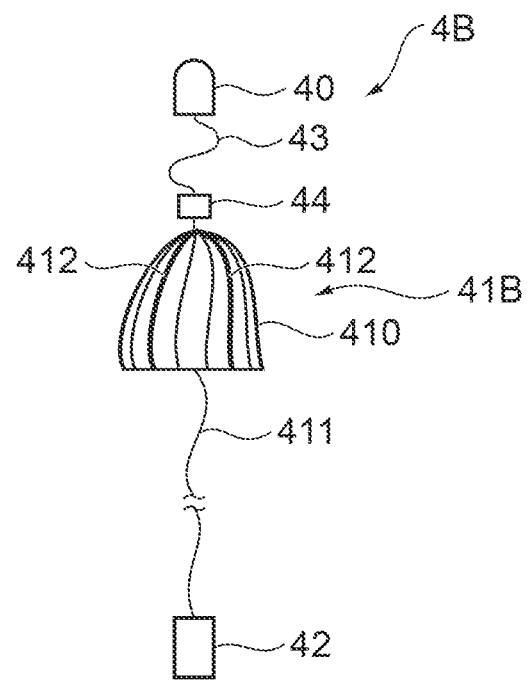
FIG. 20A A diagram for explaining parachute opening control by a parachute opening control device of the parachute device according to the second modification.
Figure 20B:
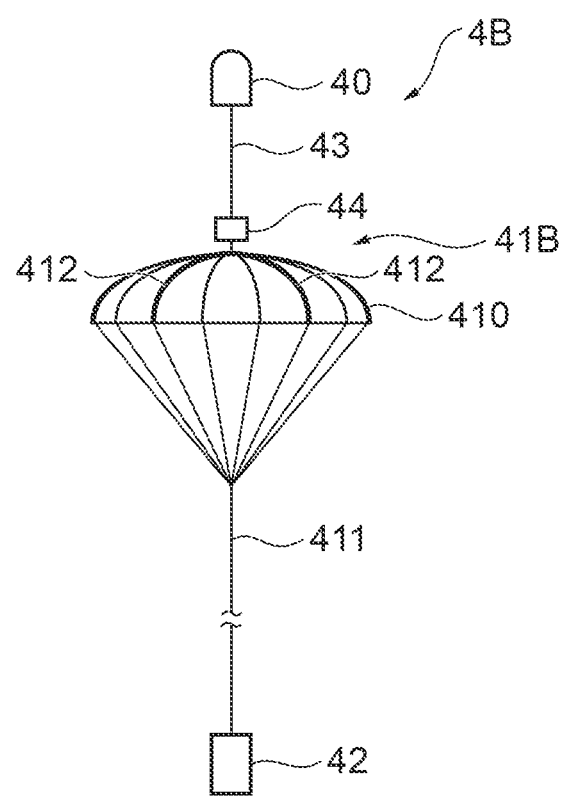
FIG. 20B A diagram for explaining the parachute opening control by the parachute opening control device of the parachute device according to the second modification.

FIG. 20A and FIG. 20B are diagrams for explaining parachute opening control by the parachute opening control device 44.

As shown in FIG. 20A, immediately after the ejection of the small flying object 40, the wire 43 coupling the small flying object 40 and the parachute body 410 is not sufficiently extended and the tensile force of the wire 43 does not exceed the predetermined level. At this time, since the parachute opening control device 44 applies the compression load to the elastic member 412 to deform the elastic member 412, the parachute body 410 does not sufficiently open.

Thereafter, when the wire 43 coupling the small flying object 40 and the parachute body 410 is sufficiently extended and the tensile force of the wire 43 exceeds the predetermined level, the parachute opening control device 44 releases the compression force applied to the elastic member 412. Consequently, as shown in FIG. 20B, the elastic force of the elastic member 412 assists the unfolding of the parachute body 410. It is possible to quickly unfold the parachute body 410.

As explained above, with the parachute 41B of the parachute device 4B according to the second modification, the parachute opening control device 44 applies the compression load to the elastic member 412 to deform the elastic member 412 when the tensile force of the wire 43 coupling the small flying object 40 and the parachute body 410 is lower than the predetermined level and releases the compression load applied to the elastic member 412 when the tensile force of the wire 43 exceeds the predetermined level.

Consequently, the parachute body 410 can be opened in a state in which the parachute 41B is completely ejected from the parachute accommodating part 42. Therefore, for example, the parachute body 410 can be prevented from expanding in a state halfway in ejection when a part of the parachute 41B remains in the parachute accommodating part 42. Consequently, it is possible to more surely open the parachute 41B. It is possible to improve the safety during the fall of the flying apparatus 1A.

<<Extension of the Embodiments>>

The invention devised by the present inventor are specifically explained above based on the embodiments. However, the present invention is not limited to the embodiments. It goes without saying that the present invention can be variously changed in a range not departing from the gist of the present invention.

For example, in the second embodiment, the resistance wings 7 may be configured to be openable and closable according to the control by the fall control part 16. That is, the fall control part 16 may perform not only control for opening the resistance wings 7 but also control for closing the resistance wings 7. Consequently, it is possible to further stabilize a flying state of the flying apparatus 1 by opening and closing the resistance wings 7 in addition to rotation control for the propellers 35 of the lift-force generating parts 3 in normal flight control.

In the embodiments, the case in which the fall control parts 16 and 16A perform, only when the fall control parts 16 and 16A eject the first small flying object 40, the processing for determining, based on the detection result of the sensor part 12, the parachute accommodating part 42 disposed in the farthest position of the body units 2 and 2A from the ground is illustrated. However, the present invention is not limited to this.

For example, the fall control parts 16 and 16A may perform, after the ejection of the small flying object 40, every time, processing for determining the parachute accommodating part 42 disposed in the farthest position from the ground out of the remaining parachute accommodating parts 42 from which the small flying objects 40 are not ejected.

For example, the fall control parts 16 and 16A may determine the small flying objects 40 to be ejected third and thereafter with the same method as the method of determining the first and second small flying objects 40.

Specifically, the fall control parts 16 and 16A determine the farthest parachute accommodating part 42 based on the coordinate information 30 of the parachute accommodating parts 42_1 to 42_n stored in the memory unit 18 and the angle calculated by the angle calculating part 27 and eject the small flying object 40 of the parachute accommodating part 42 third. Thereafter, the fall control parts 16 and 16A select, based on the coordinate information 30, the parachute accommodating part 42 disposed opposite to the parachute accommodating part 42, which ejected the small flying object 40 third, across the center part O and eject the small flying object 40 of the parachute accommodating part 42 fourth.

In the embodiments, the case in which the flight control part 14 and the like functioning as the functional parts for controlling the flight in the normal state, the abnormality detecting part 15 and the fall control part 16 functioning as the functional parts for performing the fall control during the abnormality occurrence, and the memory unit 18 operate according to the power supply from the same battery 22 is illustrated. However, the present invention is not limited to this. For example, a battery for the functional parts for controlling the flight in the normal state and a battery for the functional parts for performing the fall control during the abnormality occurrence may be respectively separately prepared. Consequently, even when an abnormality occurs in the battery for the functional part for controlling the flight in the normal state and the power supply cannot be performed, it is possible to execute the fall control processing.

The functional parts for performing the fall control during the abnormality occurrence may be configured to be able to select power supply from the two batteries. Consequently, the functional parts can receive the power supply from another battery even when an abnormality occurs in one battery. Therefore, it is possible to surely execute the fall control processing.

In the embodiments, shock absorbing members such as airbags may be provided on the lower surfaces of the body units 2 and 2A. Consequently, it is possible to further improve the safety during the fall of the flying apparatus 1 and 1A.

In the embodiments, the small flying object 40 may be a spherical body ejected in a drogue gun system rather than the structure that jets gas explained above.

In the embodiments, the case in which the small flying object 40 includes the three nozzles 405 is illustrated. However, the small flying object 40 may include four or more nozzles. For example, the small flying object 40 may include four nozzles 405. The four nozzles 405 may be disposed such that the directions of ejection ports of the four nozzles 405 deviate by 90 degrees (a value obtained by dividing a sum of interior angles of an N-polygon by N) from one another. The small flying object 40 may include five nozzles 405. The five nozzles 405 may be disposed such that the directions of ejection ports of the five nozzles 405 deviate by 108 degrees from one another.

LIST OF REFERENCE SIGNS 1, 1A flying apparatus
2, 2A body unit
3 lift-force generating part
4, 4A, 4B parachute device
5 informing device
6 arm part
7 resistance wing
9 external device
11 power supply part
12 sensor part
13 motor driving part
14 flight control part
15 abnormality detecting part
16, 16A fall control part
17 communication part
18 memory unit
22 battery 23 power supply circuit
24 angular velocity sensor
25 acceleration sensor
26 magnetic sensor
27 angle calculating part
28 residual capacity threshold
29 tilt threshold
30 coordinate information
31 motor
32 casing
33 protection net
35 propeller
40 small flying object
41, 41, 41B parachute
42 parachute accommodating part
43 wire
44 parachute opening control device
70 wing part
71 support frame part
72 movable frame part
73 opening and closing control part
74 spring member
75 supporting member
320A, 320B opening part
400 housing
401 gas generating device
402 gas emission chamber
403 gas introduction hole
404 gas emission hole
405 nozzle
410 parachute body (canopy)
411 suspension cord
412 elastic member
413 seam
414 top part
415 edge part
O center part
P axis
Q axis

The invention claimed is:

1. A flying apparatus comprising:
a body unit;
a lift-force generating part that is connected to the body unit and generates a lift force;
a flight control part that controls the lift-force generating part;
an abnormality detecting part that detects an abnormality during flight;
a plurality of parachute devices each including a parachute, a small flying object coupled to the parachute, and a parachute accommodating part that accommodates the parachute; and
a fall control part that ejects the parachutes from the respective parachute accommodating parts according to the detection of the abnormality by the abnormality detecting part,
the fall control part ejects each small flying object from the respective parachute accommodating part and ejects the respective parachute,
wherein the fall control part ejects, from among the plurality of parachute devices, a first small flying object of a first parachute device disposed in a farthest position of the body unit from a ground,
further comprising an informing device radiating light or sound, wherein the fall control part controls the informing device according to the detection of the abnormality by the abnormality detecting part and informs, with light or sounds, an environment outside of the flying apparatus that the flying apparatus is in a dangerous state;
wherein the small flying object includes:
a gas generating device that generates gas;
a housing that accommodates the gas generating device and includes, on an inside, a gas emission chamber in which a plurality of gas emission holes for emitting the gas generated from the gas generating device are formed; and
a plurality of nozzles respectively coupled to the gas emission holes of the housing, and each nozzle provided to be inclined at a respective angle with respect to an axis of the housing, so that the emitted gas from each respective nozzle is jetted obliquely to the axis of the housing and the small flying object rotates when ejected.

2. The flying apparatus according to claim 1, wherein further comprising an openable and closable resistance wing, wherein
the fall control part opens the resistance wing according to the detection of the abnormality by the abnormality detecting part.

3. The flying apparatus according to claim 2, wherein the resistance wing is openable and closable according to control from the fall control part.

4. The flying apparatus according to claim 1,
wherein the fall control part ejects a plurality of the small flying objects of the respective plurality of parachute devices while staggering the ejections in time.

5. The flying apparatus according to claim 4,
further comprising a sensor part that detects a tilt of the body unit, wherein
the fall control part selects, based on a detection result of the sensor part, the first parachute device disposed in the farthest position of the body unit from said ground among the respective plurality of parachute devices from which the plurality of small flying objects are not ejected.

6. The flying apparatus according to claim 5, wherein the fall control part ejects the plurality of small flying objects in one direction, in order from an adjacent parachute device adjacent to the first selected parachute device that ejected the first small flying object first.

7. The flying apparatus according to claim 5,
wherein the fall control part ejects, following the first small flying object ejected first, a second small flying object of an opposite parachute device disposed opposite to the first selected parachute device, which ejected the first small flying object, across a center part of the body unit.

8. The flying apparatus according to claim 7, wherein the fall control part ejects the plurality of small flying objects in one direction in order from an adjacent parachute device adjacent to the parachute device that ejected the second small flying object second.

9. A flying apparatus comprising:
a body unit;
a lift-force generating part that is connected to the body unit and generates a lift force;
a flight control part that controls the lift-force generating part;
an abnormality detecting part that detects an abnormality during flight;
a parachute device including a parachute and a parachute accommodating part that accommodates the parachute; and a fall control part that ejects the parachute from the parachute accommodating part according to the detection of the abnormality by the abnormality detecting part, wherein the parachute device further comprises a small flying object coupled to the parachute, and the fall control part ejects the small flying object from the parachute accommodating part and ejects the parachute, wherein the small flying object includes:

a gas generating device that generates gas;

a housing that accommodates the gas generating device and includes, on an inside, a gas emission chamber in which a plurality of gas emission holes for emitting the gas generated from the gas generating device are formed; and a plurality of nozzles respectively coupled to the gas emission holes of the housing, and each nozzle provided to be inclined at a respective angle with respect to an axis of the housing, so that the emitted gas from each respective nozzle is jetted obliquely to the axis of the housing and the small flying object rotates when ejected.

10. The flying apparatus according to claim 9, wherein the parachute includes:

a parachute body;

a suspension cord that couples the parachute body and the body unit; and a bar-like elastic member that extends between a top part of the parachute body and an edge part of the parachute body.

11. The flying apparatus according to claim 10, wherein the parachute device further includes:

a wire that couples the small flying object and the parachute body; and a parachute opening control device that controls unfolding of the parachute body, and the parachute opening control device applies a compression load to the elastic member to deform the elastic member in a state in which a tensile force of the wire is lower than a predetermined level and, when the tensile force of the wire exceeds the predetermined level, releases the compression load of the elastic member.

12. The flying apparatus according to claim 9, further comprising an informing device radiating light or sound, wherein the fall control part controls the informing device according to the detection of the abnormality by the abnormality detecting part and informs, with light or sound, an environment outside of the flying apparatus that the flying apparatus is in a dangerous state.

\* \* \* \* \*